US008634490B2

(12) United States Patent
Chockalingam et al.

(10) Patent No.: US 8,634,490 B2
(45) Date of Patent: Jan. 21, 2014

(54) TECHNIQUES FOR DETECTION OF SIGNALS IN MULTIPLE-INPUT MULTIPLE-OUTPUT COMMUNICATION SYSTEMS

(75) Inventors: Ananthanarayanan Chockalingam, Bangalore (IN); Balaji Sundar Rajan, Bangalore (IN); Srinidhi Nagaraja, Bangalore (IN); Tanumay Datta, Bangalore (IN)

(73) Assignee: Indian Institute of Science, Bangalore (IN)

( * ) Notice: Subject to any disclaimer, the term of this patent is extended or adjusted under 35 U.S.C. 154(b) by 0 days.

(21) Appl. No.: 13/545,010

(22) Filed: Jul. 10, 2012

(65) Prior Publication Data
US 2013/0039436 A1 Feb. 14, 2013

(30) Foreign Application Priority Data

Jul. 11, 2011 (IN) .......................... 2372/CHE/2011

(51) Int. Cl.
*H04B 7/02* (2006.01)
*H04L 1/02* (2006.01)

(52) U.S. Cl.
USPC ........... 375/267; 375/261; 375/260; 375/262; 375/347; 375/341; 375/320; 375/340; 375/150; 375/142; 375/324; 455/296; 455/226.1; 370/209; 370/342

(58) Field of Classification Search
USPC ......... 375/267, 261, 260, 262, 347, 341, 320, 375/340, 150, 142, 324; 455/296, 226.1; 370/209, 342
See application file for complete search history.

(56) References Cited

U.S. PATENT DOCUMENTS

| 6,377,615 | B1 * | 4/2002 | Sourour et al. ............... 375/150 |
|---|---|---|---|
| 2004/0242179 | A1 * | 12/2004 | Onggosanusi et al. ........ 455/296 |
| 2006/0188044 | A1 * | 8/2006 | Wang et al. .................. 375/347 |
| 2007/0054621 | A1 | 3/2007 | Larsson |
| 2009/0213965 | A1 * | 8/2009 | Maeda et al. ................ 375/341 |
| 2009/0232241 | A1 * | 9/2009 | Shabany et al. .............. 375/262 |
| 2010/0040177 | A1 * | 2/2010 | Dick et al. ................... 375/341 |
| 2010/0054365 | A1 * | 3/2010 | Cheng et al. ................ 375/320 |

OTHER PUBLICATIONS

"Weifeng Su","Stella N. Batalama","Dimitris A. Pados", On Orthogonal Space-Time Block Codes and Transceiver Signal Linearization, IEEE Communications Letters, Feb. 2006, pp. 1-3, vol. 10, No. 2.

(Continued)

*Primary Examiner* — Sam K Ahn
*Assistant Examiner* — Fabricio R Murillo Garcia
(74) *Attorney, Agent, or Firm* — Narendra Reddy Thappeta

(57) ABSTRACT

A receiver of a multiple-input multiple-output (MIMO) system performs QR decomposition of the channel matrix to enable detection of a transmitted vector in a layered manner. In each layer, a sub-vector of the transmitted vector is estimated. A reactive tabu search is performed if an estimated symbol differs from a nearest symbol in the alphabet by a predetermined value. The receiver may order the entries of the channel matrix prior to QR decomposition to enable estimation in an optimum order. In another embodiment, a receiver performs multiple reactive tabu searches to estimate a transmitted vector. The receiver employs a fixed threshold or a variable threshold for a cost function used in the multiple reactive tabu searches depending on whether the MIMO system is under-determined or not. The techniques enable low bit-error rate (BER) performance in MIMO systems with large number of antennas and when higher-order modulation techniques are used.

16 Claims, 7 Drawing Sheets

(56) References Cited

OTHER PUBLICATIONS

"Erik G. Larsson", MIMO Detection Methods: How They Work, IEEE Signal Processing Magazine, May 2009, pp. 1-6.

"Mohammad-Ali Khalighi,Joseph Jean Boutros", Semi-Blind Channel Estimation Using the EM Algorithm in Iterative MIMO APP Detectors, IEEE Transactions on Wireless Communications, vol. 5, No. 11, pp. 3165-3173,Nov. 2006.

"Fred Glover", Tabu Search and Adaptive Memory Programming Advances, Applications and Challenges,1996, pp. 1-77, Interfaces in Computer Science and Operations Research. Barr, Helgason and Kennington, eds., Kluwer Academic Publishers.

"Joubert, J W", A Tabu search solution algorithm,university of Pretoria, pp. 83-91.

"Peter Reinders", Demystifying MIMO and 802.11n, 2007 Bluesocket, Inc,pp. 1-25.

Rishna Sankar, "MIMO with Zero Forcing equalizer", http://www.dsplog.com/2008/10/24/mimo-zero-forcing, Oct. 24, 2008, pp. 1-31.

N. Srinidhi, Tanumay Datta, A. Chockalingam, and B. Sundar Rajan, "Layered Tabu Search Algorithm for Large-MIMO Detection and a Lower Bound on ML Performance," presented in IEEE Globecom 2010, Miami, USA, Dec. 2010, pp. 1-5.

Tanumay Datta, N. Srinidhi, A. Chockalingam, and B. Sundar Rajan, "Random-Restart Reactive Tabu Search Algorithm for Detection in Large-MIMO Systems," IEEE Communication Letters, No. 12, Dec. 2010,pp. 1107-1109.

E. Telatar, "Capacity of Multi-Antenna Gaussian Channels," European Trans. Telecommun., vol. 10, No. 6, Nov. 1999,pp. 585-595.

K. Vishnu Vardhan, S. K. Mohammed, A. Chockalingam, and B.S. Rajan, "A Low-Complexity Detector for Large MIMO Systems and Multicarrier CDMA Systems," IEEE J. Sel. Areas Commun., vol. 26, No. 3, Apr. 2008,pp. 473-485.

S. K. Mohammed, A. Zaki, A. Chockalingam, and B. S. Rajan, "Highrate Space-Time Coded Large-MIMO Systems: Low-Complexity Detection and Channel Estimation," IEEE J. Sel. Topics Signal Process., vol. 3, No. 6, Dec. 2009,pp. 1-17.

N. Srinidhi, S. K. Mohammed, A. Chockalingam, and B. S. Rajan, "Low-Complexity Near-ML Decoding of Large Non-Orthogonal STBCS Using Reactive TABU Search," in Proc. IEEE ISIT'2009, Jul. 2009,pp. 1-11.

N. Srinidhi, S. K. Mohammed, A. Chockalingam, and B. S. Rajan, "Near-ML Signal Detection in Large-Dimension Linear Vector Channels Using Reactive TABU Search," arXiv:0911.4640v1 [cs.IT] Nov. 24, 2009,pp. 1-11.

M. Hansen, B. Hassibi, A. G. Dimakis, and W. Xu, "Near-Optimal Detection in MIMO Systems Using Gibbs Sampling,"IEEE ICC'2009, Dec. 2009,pp. 1-6.

P. Som. T. Datta, A. Chockalingam, and S. S. Rajan, "Improved Large-MIMO Detection Based on Damped Belief Propagation," in Proc. IEEE ITW'2010, Cairo, Jan. 2010,pp. 1-5.

P. Li and R. D. Murch, "Multiple Output Selection—LAS Algroithm in Large MIMO Systems," IEEE Commun. Lett., vol. 14, No. 5,May 2010,pp. 399-401.

R. Battiti and G. Tecchiolli, "The Reactive TABU Search," Orsa J. Computing, No. 2, , 1994,pp. 126-140.

L. G. Barbero and J. S. Thompson, "Fixing the Complexity of the Sphere Decoder for MIMO Detection," IEEE Trans. Wireless Commun., vol. 7,No. 6, Jun. 2008,pp. 2131-2142.

N. D. Sidiropoulos and Z. Q. Luo, "A Semidefinite Relaxation Approach to MIMO Detection for High-Order QAM Constellations," IEEE Sig. Process. Lett., vol. 13, No. 9, Sep. 2006,pp. 525-528.

J. Goldberger and A. Leshem, "MIMO Detection for High-Order QAM Based on a Gaussian Tree Approximation," arXiv:1001.5364v1 [cs.It] Jan. 29, 2010,pp. 1-19.

I. E. Telatar, "Capacity of Multi-Antenna Gaussain Channels," European Trans. Telecommun., vol. 10, No. 6, Nov. 1999,pp. 1-28.

A. Paulraj, R. Nabar, and D. Gore, Introduction to Space-Time Wireless Communications, Cambridge University Press, 2003,pp. 1-33.

H. Taoka and K. Higuchi, "Field Experiment on 5-Gbit/S Ultra-Highspeed Packet Transmission Using MIMO Multiplexing in Broadband Packet Radio Access," NTT DoCoMo Tech. Journ., vol. 9, No. 2, Sep. 2007,pp. 25-31.

H. Taoka and K. Higuchi, "Experiments on Peak Spectral Efficiency of 50 BPS/HZ With 12-by-12 MIMO Multiplexing for Future Broadband Packet Radio Access," Intl. Symp. on Commun., Contr., and Sig. Proc. (ISCCSP'2010), Limassol, Cyprus, Mar. 2010,pp. 1-6.

Gregory Breit et al, 802.11AC Channel Modeling, doc. IEEE 802.11-09/0088r0, submission to Task Group TGac, Jan. 19, 2009.

J. Koivunen, Characterisation of MIMO Propagation Channel in Multi-Link Scenarios, MS Thesis, Helsinki University of Technology, Dec. 2007,pp. 1-92.

K. Vishnu Vardhan, Saif K. Mohammed, A. Chockalingam, and B. Sundar Rajan, "A Low-Complexity Detector for Large MIMO Systems and Multicarrier CDMA Systems," IEEE JSAC Spl. Iss. on Multiuser Detection for Adv. Commun. Sys. & Net., vol. 26, No. 3, Apr. 2008,pp. 473-485.

Saif K. Mohammed, A. Chockalingam, and B. Sundar Rajan, "Alow-Complexity Near-ML Performance Achieving Algorithm for Large-MIMO Detection," Proc. IEEE ISIT'2008, Toronto, Jul. 2008.

Saif K. Mohammed, Ahmed Zaki, A. Chockalingam, and B. Sundar Rajan, "High-Rate Space-Time Coded Large-MIMO Systems: Lowcomplexity Detection and Channel Estimation," IEEE Jl. Sel. Topics in Sig. Proc. (JSTSP): Spl. Iss. on Manging Complexity in Multiuser MIMO Systems, vol. 3, No. 6, Dec. 2009,pp. 958-974.

F. Glover, "TABU Search—Part I," Orsa JL. of Computing, vol. 2, No. 3, Summer 1989, pp. 190-206.

F. Glover, "TABU Search—Part II," Orsa JL. of Computing, vol. 2, No. 1, Winter 1990, pp. 4-32.

N. Srinidhi, Saif K. Mohammed, A. Chockalingam, B. Sundar Rajan, "Low-Complexity Near-ML Decoding of Large Non-Orthogonal STBCS Using Reactive TABU Search," Proc. IEEE ISIT'2009, Seoul, Jul. 2009,pp. 1-11.

N. Srinidhi, Saif K. Mohammed, A. Chockalingam, and B. Sundar Rajan, "Near-ML Signal Detection in Large-Dimension Linear Vector Channels Using Reactive TABU Search," Online arXiv:0911.4640v1 [cs.It] Nov. 24, 2009,pp. 1-11.

M. Hansen, B. Hassibi, A. G. Dimakis, and W. Xu, "Near-Optimal Detection in MIMO Systems Using Gibbs Sampling," Proc. IEEE ICC'2009, Honolulu, Hawaii, Dec. 2009,pp. 1-14.

Pritam Som, Tanumay Datta, A. Chockalingam, and S. Sundar Rajan, "Improved Large-MIMO Detection Based on Damped Belief Propagation,"Proc. IEEE ITW'2010, Cairo, Jan. 2010,pp. 1-5.

X. Zhu and R. D. Murch, "Performance Analysis of Maximumlikelihood Detection in AMIMO Antenna System," IEEE Trans. on Commun., vol. 50, No. 2, Feb. 2002,pp. 1-5.

I. E. Telatar, "Capacity of Multi-Antenna Gaussain Channels," European Trans. on Telecommun., vol. 10, No. 6, Nov. 1999,pp. 1-28.

C-Y. Chiu, J-B. Yan, and R. D. Murch, "24-Port and 36-Port Antenna Cubes Suitable For MIMO Wireless Communications," IEEE Trans. Ant. & Prop., vol. 36, No. 4, Apr. 2008,pp. 1170-1176.

K. Vishnu Vardhan, Saif K. Mohammed, A. Chockalingam, and B. Sundar Rajan, "A Low-Complexity Detector for Large MIMO Systems and Multicarrier CDMA Systems," IEEE Jl. Sel. Areas Commun., vol. 26, No. 3, Apr. 2008,pp. 473-485.

Saif K. Mohammed, Ahmed Zaki, A. Chockalingam, and B. Sundar Rajan, "High-Rate Space-Time Coded Large-MIMO Systems: Lowcomplexity Detection and Channel Estimation," IEEE Jl. Sel. Topics in Sig. Proc., vol. 3, No. 6, Dec. 2009,pp. 958-974.

P. Li and R. D. Murch, 'Multiple Output Selection—LAS Algorithm in Large MIMO Systems,' IEEE Commun. Letters, vol. No. 5, May 2010,pp. 399-401.

N. Srinidhi, Saif K. Mohammed, A. Chockalingam, B. Sundar Rajan, "Near-ML Signal Detection in Large-Dimension Linear Vector Channels Using Reactive TABU Search," arXiv:0911.4640v1 [cs.IT] Nov. 24, 2009.

Pritam Som, Tanumay Datta, A. Chockalingam, and S. Sundar Rajan,"Improved Large-MIMO Detection Based on Damped Belief Propagation," Proc. IEEE ITW'2010, Cairo, Jan. 2010,pp. 1-11.

M. Hansen, B. Hassibi, A. G. Dimakis, W. Xu, "Near-Optimal Detection in MIMO Systems Using Gibbs Sampling," Proc. IEEE ICC'2009, Hawaii, Dec. 2009,pp. 1-14.

(56) References Cited

OTHER PUBLICATIONS

M. O. Damen, K. Abed-Meraim, and J.-C. Belfiore, "A Generalized Sphere Decoder for Asymmetrical Space-Time Communication Architecture," Electronics Letters, vol. 36, No. 2, 2000, pp. 166-167.

P. Dayal and M. K. Varanasi, "A Fast Generalized Sphere Decoder for Optimum Decoding of Under-Determined MIMO Systems," 41st Annual Allerton Conf. Commun. Control. Comput., Oct. 2003,pp. 1-10.

Z. Yang, C. Liu, and J. He, "A New Approach for Fast Generalized Sphere Decoding in MIMO Systems," IEEE Sig. Proc. Lett., vol. No. 1, Jan. 2005,pp. 1-4.

K.-K.Wong and A. Paulraj, "Efficient Near Maximum-Likelihood Detection for Underdetermined MIMO Antenna Systems Using a Geometrical Approach," EURASIP JL. Wireless Commun. and Networking, vol. 2007, article ID 84265,pp. 1-13.

P. Wang and T. Le-Ngoc, "A Low-Complexity Generalized Sphere Decoding Approach for Underdetermined Linear Communication Systems: Performance and Complexity Evaluation," IEEE Trans. Commun., vol. 57, No. 11, Nov. 2009,pp. 3376-3388.

B. A. Sethuraman, B. Sundar Rajan, and V. Shashidhar, "Full-Diversity High-Rate Space-Time Block Codes From Division Algebras," IEEE Trans. Inf. Theory, vol. 49, No. 10, Oct. 2003,pp. 2596-2616.

Ernesto Zimmermann and Gerhard Fettweis, "Improved Length Term Calculation and MMSE Extension for LISS MIMO Detection", Vodafone Chair at TU Dresden, D-01062 Dresden, Germany, Year 2006 pp. 1-5.

Nadia KHALED1, Geert Leus, Claude Desset and Hugo De Man, "A Robust Joint Linear Precoder and Decoder MMSE Design for Slowly Time-Varying MIMO Channels", IEEE ICASSP 2004, pp. 1-4.

Yun Wang , Jinkuan Wang and Zhibin Xie, "Ordered Successive Interference Cancellation MIMO Decision Feedback Equalization Based on Constant Modulus Property", vol. 4, No. 4, pp. 500-511, year 2008 Institute for Scientific Computing and Information,pp. 1-12.

Krishna Sankar, "MIMO With Zero Forcing Successive Interference Cancellation Equalizer", http://www.dsplog.com/2008/11/09/mimo-zero-forcing-successive interference-cancellation/, Year Nov. 9, 2008, pp. 1-11.

Krishna Sankar, "MIMO With MMSE Equalizer",http://www.dsplog.com/2008/11/02/mimo-mmse-equalizer/print/, Year Nov. 2, 2008, pp. 1-11.

D. Gesbert, "Robust Linear MIMO Receivers:A Minimum Error-Rate Approach", IEEE TR. SIG. Proc. Special Issue on MIMO, Year May 2, 2003, pp. 1-28.

Sylvain Ranvier, "Overview of MIMO Systems", SMARAD / Radio Laboratory,pp. 1-14.

\* cited by examiner

TECHNIQUES FOR DETECTION OF SIGNALS IN MULTIPLE-INPUT MULTIPLE-OUTPUT COMMUNICATION SYSTEMS

RELATED APPLICATIONS

The present application is related to and claims priority from co-pending India provisional patent application entitled, "TECHNIQUES FOR DETECTION OF SIGNALS IN MULTIPLE-INPUT MULTIPLE-OUTPUT COMMUNICATION SYSTEMS", application serial number: 2372/CHE/2011, filed on 11 Jul. 2011, naming as inventors Chockalingam et al. and is incorporated in its entirety herewith.

BACKGROUND

1. Technical Field

Embodiments of the present disclosure relate generally to communication systems, and more specifically to techniques for detection of signals in multiple-input multiple-output (MIMO) communication systems.

2. Related Art

Multiple-input multiple-output (MIMO) communication systems (MIMO systems) generally refer to systems in which multiple antennas are employed for communication between a transmitting device (MIMO transmitter) and a receiving device (MIMO receiver). As is well known in the relevant arts, MIMO technology provides several benefits such as increased data throughput, resistance to signal fading due to multi-path propagation effects, etc. MIMO technology is currently utilized in wireless communication according standards such as, for example, IEEE 802.11n, WiMAX, IEEE 802.11ac, LTE, LTE-A etc.

A MIMO transmitter with N antennas may be designed to transmit N symbols in a 'symbol period', one each from each of the N antennas. Thus, N symbols may be transmitted in each symbol period. One of several modulation techniques may be used to transmit each of the symbols. In addition, suitable encoding techniques may be employed in the MIMO transmitter to generate the symbols prior to modulation. A corresponding MIMO receiver with M antennas (M being equal to or different from N) may receive, on each of the M antennas, a superposition of the N symbols altered by the wireless channel during propagation from transmitter to receiver. Detection refers to determination (or estimation), at the MIMO receiver, of the values of each of the N transmitted symbols in each symbol period.

In MIMO systems that employ large numbers of antennas (for example, to achieve high data transmission rates), the process of detection may be associated with correspondingly high computational complexity. Another concern with detection techniques in a MIMO receiver may relate to performance (or reliability). In general, the detection needs to determine (or estimate) the transmitted symbols accurately, or at least within a desired error margin, usually specified in terms of bit-error rate (BER). In general, a lower BER corresponds to a better performance of the detection techniques, and vice-versa.

Therefore, it may be desirable that detection techniques used in MIMO systems be designed for achieving high reliability (near-optimal performance) and/or relatively low computational complexity.

SUMMARY

In an embodiment, a wireless receiver of a MIMO system receives a received vector (y) representing a transmitted vector (x) transmitted by a transmitter of the MIMO system. The wireless receiver generates an upper triangular matrix (R) and a unitary matrix (Q) by performing a QR decomposition of the channel matrix (H), and computes an estimate of a first symbol in the transmitted vector (x) based the equation $Rx=y'$ where $y'=Q^{-1}y$. The wireless receiver determines a symbol (SA) in the alphabet that is nearest, in terms of Euclidean distance, to the computed estimate of the first symbol. If the difference (d1) between the values of the symbol (SA) and the estimate of the first symbol is less than a predetermined threshold, the wireless receiver sets the value of the first symbol equal to the value of the symbol (SA). However, if the difference (d1) is not less than the predetermined threshold, then the wireless receiver performs a search to select the value of the first symbol from a neighbourhood of the symbol (SA). The receiver then determines the symbol (SB) in the alphabet that is nearest, in terms of Euclidean distance, to the computed estimate of the next symbol. If the difference (d2) between the values of the symbol (SB) and the estimate of the second symbol is less than a predetermined threshold, the wireless receiver sets the value of the second symbol equal to the value of the symbol (SB). However, if the difference (d2) is not less than the predetermined threshold, then the wireless receiver performs a search to select the value of both first symbol (SA) and second symbol (SB) from a neighbourhood of the both the symbols. This process is repeated till all symbols are determined.

In another embodiment, a wireless receiver of a MIMO system receives a received vector (y) representing a transmitted vector (x) transmitted by a transmitter of the MIMO system. The wireless receiver performs multiple searches to generate a corresponding number of estimates of the transmitted vector (x). The wireless receiver provides the estimate that has the least cost as the final estimate of the transmitted vector (x). Each of the multiple searches is performed as a reactive tabu search (RTS). In each RTS, the wireless receiver generates a corresponding random initial vector having with the same size as the transmitted vector (x). The wireless receiver creates a vector-neighbourhood of the random initial vector, and chooses, as a solution vector, a vector in the vector-neighbourhood that has a least cost as compared to other vectors in the vector-neighbourhood. The wireless receiver repeatedly creates corresponding vector neighbourhoods and selects a corresponding solution vector till a stop criterion is reached. The wireless receiver provides the solution vector obtained when the stop criterion is reached as one of the multiple estimates from which the final estimate is selected.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Environment

Figure 1:
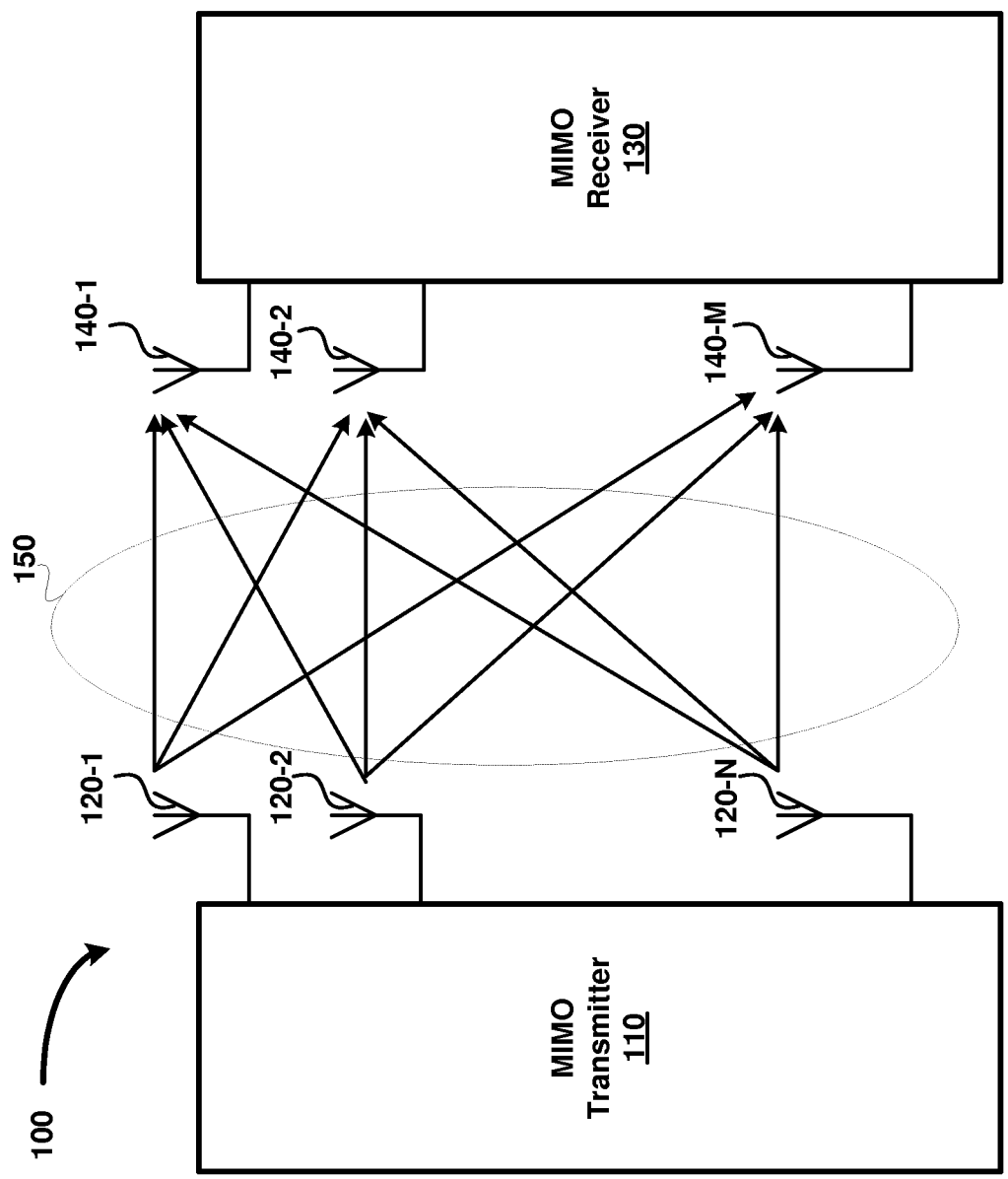
FIG. 1 is a block diagram illustrating the details of an example environment in which several embodiments can be implemented.

FIG. 1 is a block diagram illustrating the details of an example environment in which several embodiments can be implemented. MIMO system 100 is shown containing MIMO transmitter 110 with antennas 120-1 through 120-N, and MIMO receiver 130 with antennas 140-1 through 140-M. MIMO transmitter 110 may correspond, for example to, a base station, an access point or a set-top box, while MIMO receiver 130 may correspond, for example, to a mobile device or laptop computer or TV. The specific details of FIG. 1 are meant merely to illustrate, and embodiments of the present disclosure can be deployed in other environments as well. Such other environments may contain more or fewer components than shown in FIG. 1.

MIMO transmitter 110 is shown containing N antennas 120-1 through 120-N, and may transmit data via each of the N antennas. Thus, in a given "transmission time slot" (also termed herein as a symbol period), N symbols may be transmitted via the N antennas. Any of well-known modulation techniques may be used to transmit signals carrying the data. Further corresponding encoding techniques may be used within MIMO transmitter 110 for generating data or symbols transmitted via antennas 120-1 through 120-N.

As indicated by the corresponding arrows in FIG. 1, a signal transmitted from an antenna of MIMO transmitter 110 may be received at all antennas 140-1 through 140-M of MIMO receiver, with corresponding modifications in amplitude and/or phase caused by the wireless medium 150 through which it propagates. Thus, each of antennas 140-1 through 140-M receives a corresponding signal, which is a weighted sum of all transmitted signals (i.e., from all antennas 120-1 through 120-N.

The following equation specifies a signal vector received at MIMO receiver 130:

$$y = Hx + n \quad \text{Equation 1}$$

wherein, y is the received signal vector at MIMO receiver 130, and contains M entries, each corresponding to a signal received at a corresponding one of the M antennas 140-1 through 140-M, x is the transmitted signal vector from MIMO transmitter 130, and contains N entries, each corresponding to a signal transmitted from a corresponding one of the N antennas 120-1 through 120-N, H represents the channel transfer matrix of dimension M×N, with each entry (channel coefficient) representing a linear transformation of a corresponding one of the N transmitted signals prior to its reception at a corresponding one of the M receive antennas occurring due to the wireless channel, and n is a noise vector, containing M entries, with each of the M entries representing corresponding additive noise added to the signal received at the corresponding antennas 140-1 through 140-M by MIMO receiver 130.

Channel transfer matrix H may be computed by MIMO receiver 140 by known channel estimation techniques. For this purpose, MIMO transmitter 110 may transmit known pilot symbols.

The process of detection in MIMO receiver 130, therefore, entails determination or estimation of the transmitted signal vector x (i.e., the N symbols transmitted in each symbol period) based on a knowledge of channel matrix H and the measured values of received signal vector y (i.e., the signal measured at each of the M receive antennas). In addition, statistics of noise vector n may also be used in estimating transmitted signal vector x.

A prior detection technique that uses Reactive Tabu Search (RTS) is described next.

2. Reactive Tabu Search

Tabu Search (TS) is a search optimization technique that aims to avoid repetitive cycling through a same solution(s) of a "solution space" that is to be searched. RTS achieves such an objective of TS by monitoring the search, and "reacting" to the occurrence of repetitive cycles by dynamically modifying a taboo (tabu) list.

As applied in the prior detection technique to the problem of detecting symbols transmitted from a MIMO transmitter, briefly, the RTS approach starts by either computing or randomly selecting an initial solution vector x(0). Each entry of x(0) may be selected randomly from the modulation alphabet of the modulation scheme used in MIMO system 100. As an alternative to random selection, initial vector x(0) may be calculated using techniques, such as for example, matched filter (MF) method, minimum mean square error (MMSE) method, or zero forcing (ZF) method, well-known in the relevant arts. Vectors in the neighbourhood of x(0) are then examined, and that vector in the neighbourhood that has a 'minimum cost' is selected as a possible (improved) solution vector. The selection of 'neighbouring' vectors of the 'current' solution vector, and selection from among the neighbourhood vectors of a vector that minimizes the cost function are repeated iteratively till a desired criterion is reached. The best solution vector, in terms of maximum likelihood (ML) cost, obtained at the end of the procedure is provided as the final solution vector. During the iterations of the RTS approach, a 'tabu' mechanism is used to escape from local minima Certain vectors are prohibited (made taboo/tabu) from becoming solution vectors for a certain number of iterations (called a tabu period) depending on the search path to ensure efficient exploration of the search space of the solution vector.

Figure 3:
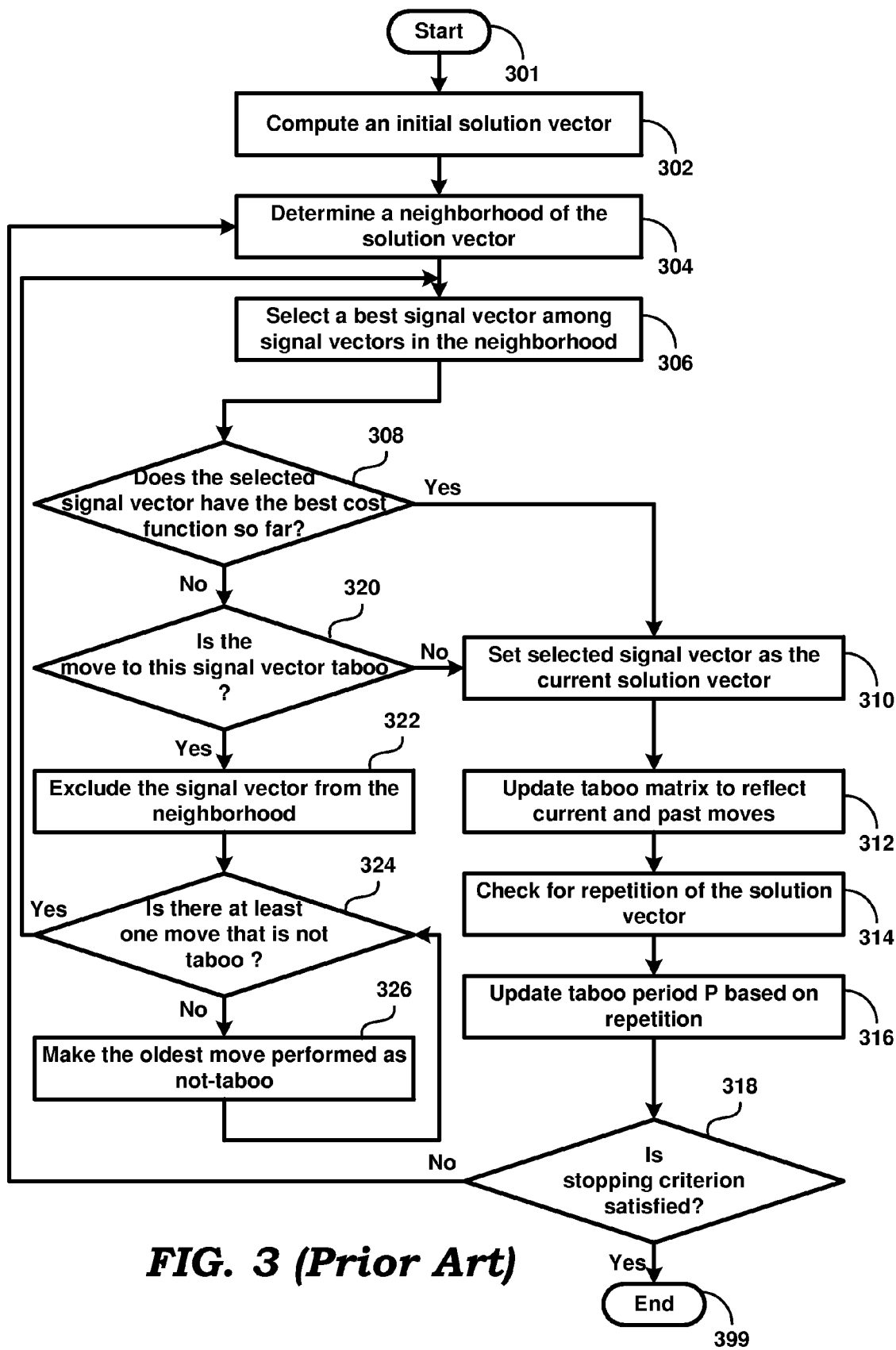
FIG. 3 is a flowchart illustrating the manner in which a transmitted signal vector is estimated according to a prior approach.

Detection using RTS is described in detail below with respect to the flowchart of FIG. 3, and the operations of the flowchart of FIG. 3 are referred to as an RTS search herein. The steps in the flowchart of FIG. 3 may be performed by MIMO receiver 130, or by a component or device external to MIMO receiver 130, but which has access to vector y, matrix H and other relevant information such as for example the configuration (number of transmit antennas, number of receive antennas, etc) of MIMO system 100. The steps of the flowchart of FIG. 3 are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein.

The flowchart starts at step 301, in which a signal vector 'y' is received at MIMO receiver 130. Control then passes to step 302.

In step 302, an initial solution vector x(0) is computed. x(0) may be randomly selected or computed based on MF, MMSE, ZF techniques, etc., as noted above.

x(0) may be computed based on MF technique as specified by Equation 2 below:

$$x(0) = H^H y \qquad \text{Equation 2}$$

wherein, $H^H$ is the Hermitian (conjugate) transpose of channel matrix H.

x(0) may be computed based on MMSE technique as specified by Equation 3 below:

$$x(0) = \left( H^H H + \frac{N_0}{E_s} I \right)^{-1} H^H y \qquad \text{Equation 3}$$

wherein, $[\ ]^{-1}$ represents a matrix inverse operation, and $E_s/N_0$ represents the ratio of the average symbol energy to the noise variance at the receiver.

x(0) may be computed based on ZF technique as specified by Equation 3 below $$x(0) = (H^H H)^{-1} H^H y \qquad \text{Equation 4}$$

The elements of x(0) obtained using Equations 2, 3 or 4 may be quantized to the nearest element in the modulation alphabet.

Figure 2B:
FIG. 2B is a diagram used to illustrate the neighbourhood of a symbol.
Figure 2A:
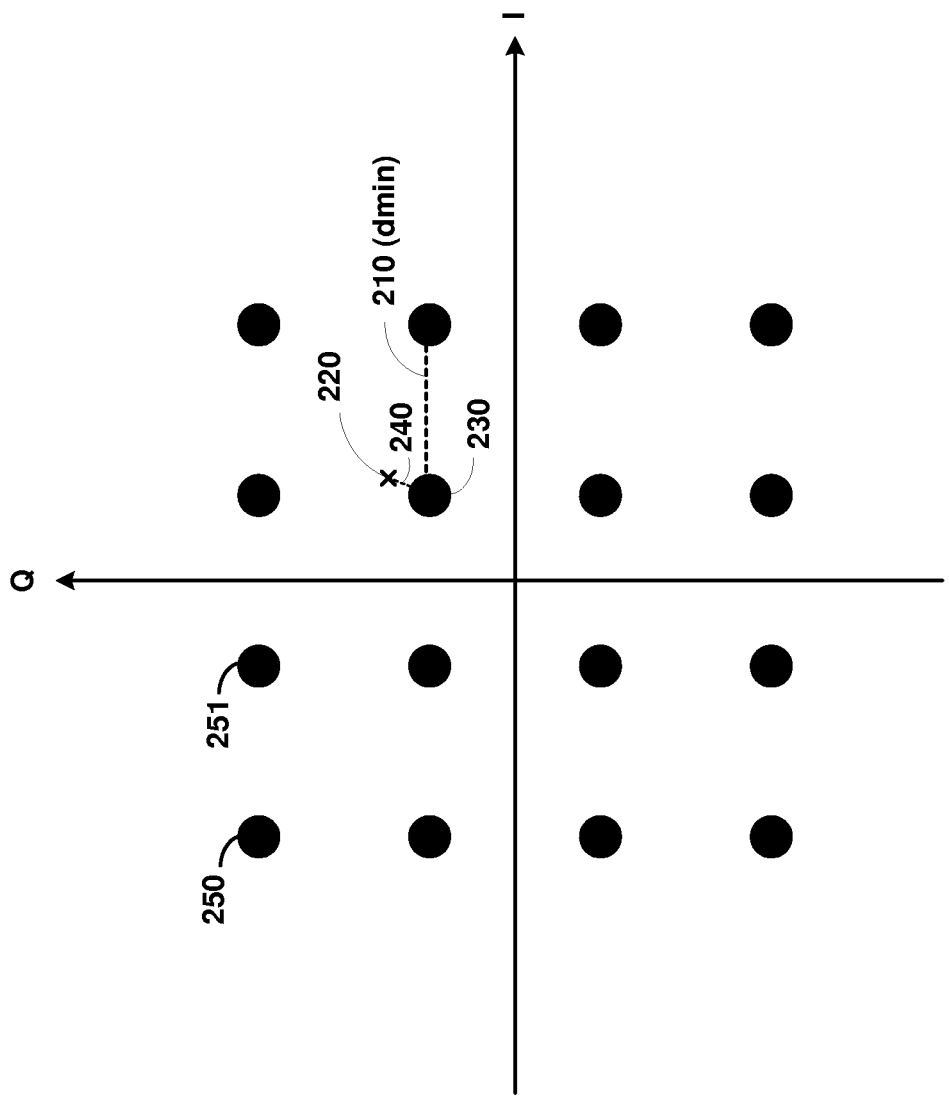
FIG. 2A is a constellation diagram for rectangular 16-QAM.

Alternatively, The entries of x(0) may be selected randomly from the modulation alphabet used by the modulation scheme used in MIMO transmitter 110 for transmitting signals via antennas 120-1 through 120-N. For example, as is well-known in the relevant arts, the modulation alphabet for 16-QAM is the set of sixteen constellation points in a complex-plane constellation diagram for 16-QAM, as shown in FIG. 2A, in which each of the sixteen dots (such as 250 and 251), represents a constellation point. Thus, if 16-QAM is used, the N entries of x(0) may be selected to be any of the sixteen symbols shown in FIG. 2A.

Control then passes to step 304.

In step 304, a neighbourhood of the 'current' solution vector is determined In the first iteration of the flowchart of FIG. 3, x(0) equals the 'current' solution vector. In an embodiment, the 'neighbourhood' (vector-neighbourhood) of the current solution vector is the set of all vectors determined based on changing, one at a time, each one of the elements of the current solution vector.

Neighbourhood of an element (symbol) of the current solution vector may be selected in one of several ways. For example, the neighbourhood of an element may be based on Euclidean distance. To illustrate, FIG. 2B shows four symbols a1, a2, a3 and a4. The 'separation' in FIG. 2B between any pair of symbols may be in the form of magnitude, phase, a combination of magnitude and phase, or some other parameter of the signals represented by the symbols a1 through a4. Assuming for simplicity that the separation is based only on magnitude, with a1, a2, a3 and a4 having magnitudes in ascending order, one example way of defining the neighbourhoods of each of the four symbols is provided below:

$$N(a1) = \{a2, a3\},$$

$$N(a2) = \{a1, a3\},$$

$$N(a3) = \{a2, a4\}, \text{ and}$$

$$N(a4) = \{a3, a2\},$$

wherein N( ) represents a 'neighbourhood'. For example, the set of symbols a2 and a3 represents the neighbourhood of symbol a1, and so on.

In the example above, the two nearest symbols are defined to form the neighbourhood of a symbol. However, other (e.g., wider-sized or narrower-sized) neighbourhoods may also be defined. For example, the following neighbourhoods may instead be defined:

$$N(a1) = \{a2, a3, a4\},$$

$$N(a2) = \{a1, a3, a4\},$$

$$N(a3) = \{a2, a4, a1\}, \text{ and}$$

$$N(a4) = \{a3, a2, a1\}.$$

Size of the neighbourhood of a symbol may be selected based on the modulation alphabet size M used in MIMO system 100. Neighborhoods of solution vectors can be defined in other ways as well, such as to choose vectors for the neighbourhood that differ from a given solution signal vector in multiple coordinates. An example of neighbourhood vectors of a solution vector $[a1\ a2\ a3]^T$ is shown below:

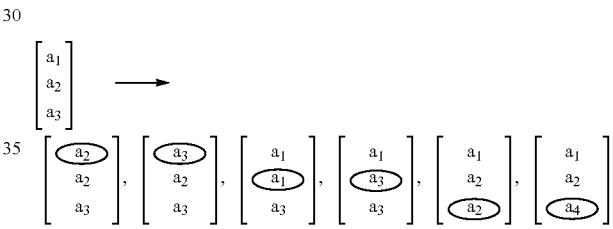

In the example above, the set of vectors $[a2\ a2\ a3]^T$, $[a3\ a2\ a3]^T$, $[a1\ a1\ a3]^T$, $[a1\ a3\ a3]^T$, $[a1\ a2\ a2]^T$ and $[a1\ a2\ a4]^T$ are shown as the vectors in the neighbourhood of solution vector $[a1\ a2\ a3]^T$. The notation $[\ ]^T$ indicates transpose of a vector.

Control then passes to step 306.

In step 306, a "best" vector among the neighbouring signal vectors neighbourhood is selected as the current solution vector. The "best" vector may be determined heuristically as that vector (from among the neighbouring vectors) that minimizes an objective function. For example, the best vector may be selected as the vector that minimizes $\|y-Hx\|^2$.

It may be appreciated that the computational complexity involved in determining the best vector increases with the size of the neighbourhood selected, which in turn may need to be larger as the number of antennas used in MIMO system 100 increases. Accordingly, in some embodiments only a subset of the entire possible neighbourhood of the current solution vector may be searched to determine the best vector. The best vector may be selected even if the best signal is worse, in terms of likelihood, than the current solution vector.

Control then passes to step 308.

In step 308, it is determined if vector selected in step 306 has the best cost function thus far in the operations of the flowchart of FIG. 3. If the vector has the best cost function thus far, control passes to step 310, in which the selected vector of step 306 is set as the 'current' solution vector. If the vector does not have the best cost function thus far, control passes instead to step 320.

In defining the neighbourhood of the solution vector in a given iteration, the flowchart of FIG. 3 attempts to avoid being trapped in local minima. Accordingly, a move to a solution vector which determined earlier (in earlier iterations of the flowchart of FIG. 4) may be marked as 'taboo' (tabu), and selection of such taboo vectors as potential solution vectors may be prohibited for a 'tabu period (P)'. Such an approach avoids repeated selection of a same vector as a potential solution vector (and thereby being trapped in a local minimum), and thus permits the iterations of the flowchart of FIG. 3 to examine other vectors as possible solutions.

Tabu period (P) may be set to equal a number of iterations (I) of the flowchart of FIG. 3 that must be completed before which a previously selected vector is may be reconsidered as a potential solution vector. Taboo period (P) may either be static (set to remain constant throughout the operation of the flowchart of FIG. 3), or be dynamically changed. According to conventional terminology, if P is changed dynamically (for example, P is increased for a vector if such vector is obtained more frequently), the search is referred to as a reactive taboo search (RTS).

Information specifying solution vectors and their corresponding taboo period entries may be stored in a tabu matrix. The tabu matrix may initially include all zero entries, and be updated with solution vectors and their corresponding P entries as the flowchart of FIG. 3 progresses through its iterations.

In step 312, the tabu matrix is updated to reflect current and past moves. Once a vector is selected (in step 306), the corresponding entry for the selected vector in the tabu matrix is made equal to the tabu period (P). Tabu period entries for vectors in the tabu matrix are decremented by one in each iteration of the flowchart of FIG. 3. A tabu period of zero is however not further decremented, and is maintained at zero. Vectors with non-zero tabu period entries are excluded from consideration (in step 306). Control then passes to step 314.

In step 314, a check is made for repetition of the solution vector. Control then passes to step 316, in which the corresponding tabu period (P) is updated based on the repetition. The taboo period can be updated to suit a search space. For example, the tabu period may be decreased when a number of iterations have been executed and no repetition of selected signal vectors has occurred, or alternatively, the tabu period may be increased when a number of iterations have been executed and repetition of selected signal vectors has occurred. Control then passes to step 318.

In step 318, if a stopping criterion is satisfied (described below), then the best solution vector found so far is provided as a final solution vector (i.e., final estimate of transmitted signal vector x), and the flowchart ends in step 399. If the stopping criterion is not satisfied, control passes to step 304, and the corresponding steps of the flowchart of FIG. 4 may be executed.

In step 320, it is checked whether a 'move to the vector' selected in step 306 is taboo. Thus, the entry corresponding to the selected vector in the tabu matrix may be examined for a non-zero value. The term 'move to the vector' refers to selection of the vector as a potential solution vector, which may be refined or updated in further iterations of the flowchart of FIG. 4. If the move to the vector is not taboo (tabu), control passes to step 310, and the corresponding steps of the flowchart of FIG. 3 may be executed.

However, if the move to the vector is taboo, control passes to step 322, in which the vector is excluded from the neighbourhood. Thus, for example, the excluded vector may not be selected again during its tabu period. Control then passes to step 324.

In step 324, it is determined if there is at least one move that is not taboo. Control passes to step 306 if there is at least one vector (in the neighbourhood) that is not taboo, and the corresponding steps of the flowchart of FIG. 3 are executed. However, if all moves are taboo, control passes to step 326.

Figure 4:
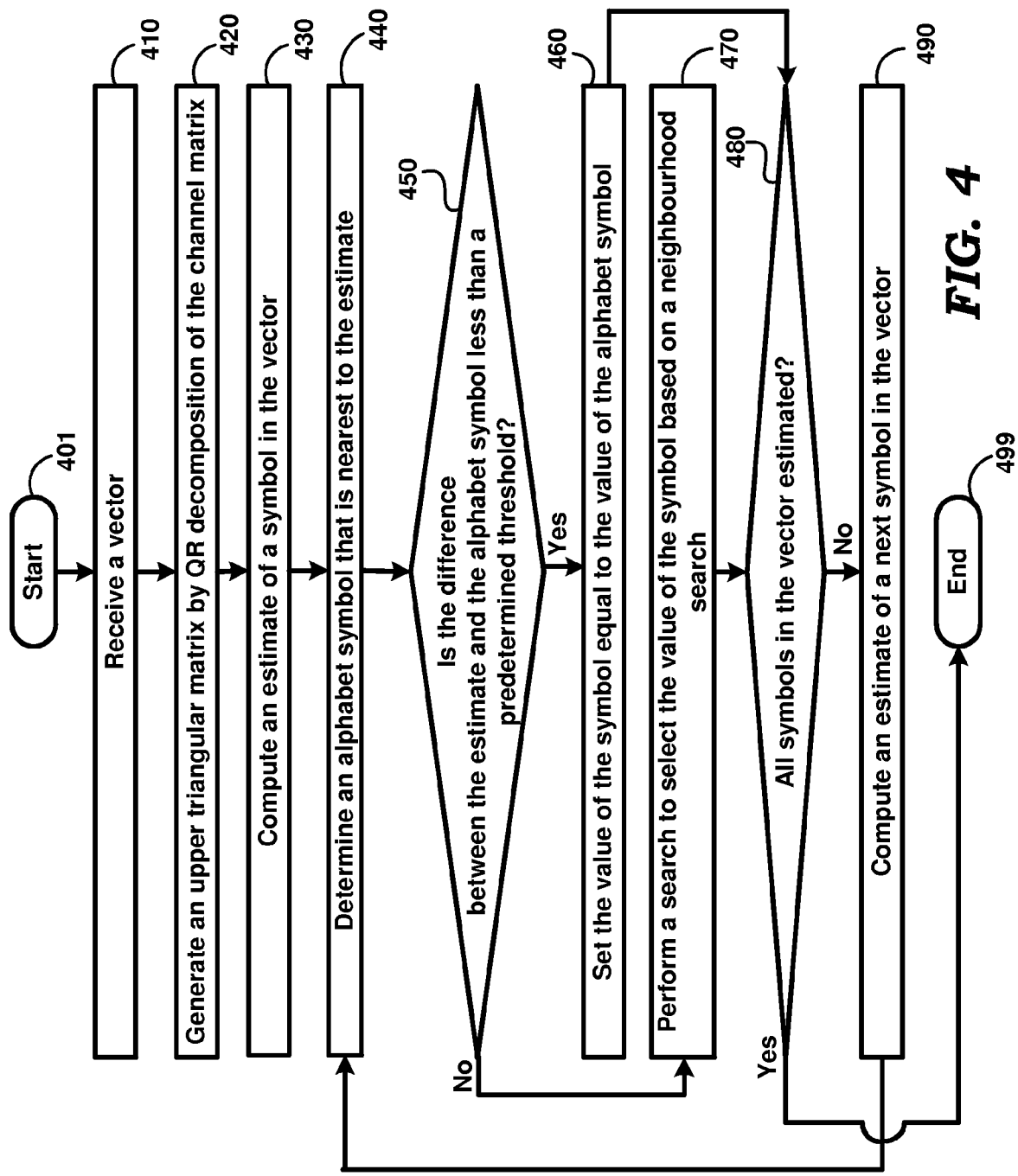
FIG. 4 is a flowchart illustrating the manner in which a transmitted signal vector is estimated in an embodiment.

In step 326, an oldest move performed as not taboo is made, and control passes to step 324, and the corresponding steps of the flowchart of FIG. 4 are executed.

The operations of the flowchart of FIG. 4 end when the stopping criterion of step 318 is satisfied. One of several stopping criteria may be employed. For example, a maximum number of iterations of the flowchart of FIG. 3 may be a stopping criterion. Another example stopping criterion may be the repeated occurrence of a same solution vector a predetermined number of times.

The specific number of iterations of the flowchart of FIG. 3 before ending at step 399 may vary with signal-to-noise ratio (SNR) of the signals (i.e., vector y) received at MIMO receiver 130. For example, the number of iterations may be large at low SNRs, and relatively smaller at high SNRs. Hence, the stopping criterion of step 316 can also be based on the cost function among the cost functions computed at multiple executions of step 306. A combination of the stopping criteria noted above can also be used instead to determine the stopping criterion used in step 318.

The ML (maximum likelihood) criterion seeks to minimize $\|Hx-y\|^2$. Thus, for example, the stopping criterion may, alternatively, be deemed to have been satisfied when the value of the ML cost function ($\|Hx-y\|^2$) is within a certain range of the global minimum, which is $-y^H y$. Thus, the operations of the flowchart of FIG. 3 may be stopped when the following condition is satisfied:

$$\frac{|\phi(g^{(m)}) - (-y^H y)|}{|-y^H y|} < \alpha_1 \qquad \text{Condition 1}$$

wherein, $\phi(g^{(m)}) = g^{(m)H} H^H H g^{(m)} - 2 \operatorname{Re}\{y^H H g^{(m)}\}$, wherein Re{ } represents the real part of the term within { }, wherein $g^{(m)}$ represents the best solution vector found after m iterations have elapsed, and $\alpha_1$ is a positive constant.

The above condition may be gradually relaxed as the number of iterations of the flowchart of FIG. 4. For example, the following condition may instead be used at later iterations:

$$\frac{|\phi(g^{(m)}) - (-y^H y)|}{|-y^H y|} < m\alpha_2 \qquad \text{Condition 2}$$

wherein, m is the number of iterations elapsed and $\alpha_2$ is a positive constant.

In one embodiment, the constants $\alpha_1$ and $\alpha_2$ are preset values. In other embodiments, $\alpha_1$ and $\alpha_2$ may be calculated based on execution results of the flowchart of FIG. 4. For example, for a same set of values of x, H and n, the flowchart of FIG. 3 may be executed for a predetermined number of iterations (ignoring the stopping criterion in each iteration) when SNR is high (for example, SNR corresponding to a BER of $10^{-4}$). At the end of the number of iterations, a ratio $\delta_{max1}$ can be calculated as specified below:

$$\delta_{max\,1} = \frac{|\phi(g^{(max_1)}) - (-y^H y)|}{|-y^H y|} \quad \text{Equation 5}$$

wherein, $y^H$ represents the Hermitian transpose of vector y, and $\phi(g^{(max_1)})$ represents $g^{(max_1)H}H^H Hg^{(max_1)} - 2\,\text{Re}\{y^H Hg^{(max_1)}\}$, wherein $g^{(max_1)}$ represents the best solution vector found after maximum number of iterations have elapsed.

Values of $\delta_{max1}$ can be obtained for multiple sets of values of x, H and n, and an average of $\delta_{max1}$ can be calculated. The average value of $\delta_{max1}$ can then be set as $\alpha_1$.

In a similar manner, for a same set of x, H and n, the flowchart of FIG. 3 may again be executed for a predetermined number of iterations (ignoring the stopping criterion in each iteration) when SNR is comparatively low (for example, SNR corresponding to a BER of $10^{-2}$). At the end of the iterations, a ratio $\delta_{max2}$ can be calculated as specified below:

$$\delta_{max2} = \frac{|\phi(g^{(max_2)}) - (-y^T y)|}{|y^T y|} \quad \text{Equation 6}$$

wherein, $\phi(g^{(max_2)})$ represents $g^{(max_2)H}H^H Hg^{(max_2)} - 2\,\text{Re}\{y^H Hg^{(max_2)}\}$, wherein $g^{(max_2)}$ represents the best solution vector found after maximum number of iterations have elapsed In addition, an iteration index m' (e.g., a number of iterations) after which a best solution vector remains the same until completion of execution of the flowchart of FIG. 3 can be determined. A ratio of $$\frac{\delta_{max_2}}{m'}$$

can be calculated for multiple sets of x, H and n, and the average of $$\frac{\delta_{max_2}}{m'}$$

over the multiple sets can be used as the value of $\alpha_2$.

Thus, using Condition 1 and Condition 2, a fraction of a cost function of signal vectors selected to a length of signal vector y is compared to a threshold. The difference between the value of a global minimum cost function and the value of the cost function of the current solution signal vector is determined, and if the difference is less than a threshold, execution of the flowchart of FIG. 3 may be stopped. Method 400 ends. Alternatively, the stopping criterion may be based on a combination of Conditions 1 and 2, and a maximum number of iterations.

To determine an estimate of transmitted signal vector x as fast as possible, it may be desired to end operation of the flowchart of FIG. 3 as early as possible. Where more stringent performance is desired, the operations of the flowchart of FIG. 3 may be continued until a global best solution signal vector is obtained. In one example, in a 4-QAM system, a number of minimum iterations of the method 400 may be set to 20, a number of maximum iterations may be set to 300, a number of maximum repetitions may be set to 75, $\alpha_1 = 0.05$, and $\alpha_2 = 0.0005$.

In example embodiments, the techniques described with respect to the flowchart of FIG. 3 adapt to different levels of SNR and increases convergence where possible. For example, when SNR is high, power in a noise vector is low, and thus, a value of the true ML solution signal vector is close to $(-y^H y)$. Thus, if g(m) is close to the true ML solution, then $\phi[g(m)]$ will be close to $(-y^H y)$. At high SNRs, near or exact ML solution values may be achieved in only a few iterations of the flowchart of FIG. 3, and hence Condition 1 will be satisfied for the selected $\alpha_1$. At low SNRs, Condition 1 may not be satisfied (for given $\alpha_1$) because of high noise power. Thus, constraints can be slowly relaxed as a number of elapsed iterations of the flowchart of FIG. 3 increases, resulting in use of Condition 2. Thus, after a given number of iterations, for example 10-20 iterations, Condition 2 may replace Condition 1, and be used as the stopping criterion.

The definition of a neighbourhood is not static for all iterations of the RTS approach described above. Instead, certain signal vectors are prohibited from being included in the neighbourhood list. In addition, RTS does not stop once a local minimum is reached, but rather, enables finding of a better solution vector due to the escape strategy of allowing a move to the best neighbourhood vector even if that neighbourhood vector has a lesser likelihood (higher ML cost) than a current solution signal vector.

However, the RTS approach described above may provide only a relatively poor detection performance (higher BER) when MIMO system 100 employs higher-order modulation such as, for example, Quadrature Amplitude Modulation (QAM) with larger constellations such as 4-QAM, 16-QAM, 64-QAM, etc. Accordingly, alternatives and/or enhancements to the RTS approach are described next.

3. Layered Tabu Search (LTS)

FIG. 4 is a flowchart illustrating the manner in which a transmitted signal vector is estimated in an embodiment. The steps in the flowchart of FIG. 4 may be performed by MIMO receiver 130, or by a component or device external to MIMO receiver 130, but which has access to vector y, matrix H and other relevant information such as for example the configuration (number of transmit antennas, number of receive antennas, etc) of MIMO system 100. The steps of the flowchart of FIG. 4 are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein. The flowchart starts at step 401, in which control passes immediately to step 410.

In step 410, MIMO receiver 130 receives a "received vector" (y). The received vector y represents a corresponding transmitted vector (x) according to Equation 1 (i.e., y=Hx+n) noted above. Control then passes to step 420.

In step 420, MIMO receiver 130 generates an upper triangular matrix (R) by performing a QR decomposition of the channel matrix (H). Channel matrix (H), as noted above, represents a transformation, caused by wireless medium 150, as specified by the equation y=Hx.

As is well known in the relevant arts, QR decomposition refers to a matrix decomposition operation, in which a matrix is 'decomposed' to be expressed as a product of an upper triangular matrix (generally denoted by R) and an orthogonal matrix (generally denoted by Q). Thus, the QR decomposition of matrix H in step 420 can be expressed as shown below:

$$H = QR \quad \text{Equation 7}$$

wherein,

Q represents the orthogonal matrix obtained by the decomposition of matrix H, and R represents the upper triangular matrix obtained by the decomposition of matrix H.

Control then passes to step 430.

In step 430, MIMO receiver 130 computes an estimate of a symbol in vector x. MIMO receiver 130 performs such computation based on the equation Rx=y', where y'=$Q^{-1}$y. In particular, MIMO receiver 130 performs the computation using a row of the upper triangular matrix (R) that has only one non-zero entry. The symbol estimated in a first iteration of the flowchart of FIG. 4 is referred to herein as a 'first symbol''. Control then passes to step 440.

In step 440, MIMO receiver 130 determines a symbol (alphabet symbol) in the transmission alphabet used by MIMO transmitter 110 (and from which the symbols in transmitted vector x are selected by MIMO transmitter 110) which is nearest, in terms of Euclidean distance, to the estimate computed in step 430. Control then passes to step 450.

In step 450, MIMO receiver 130 checks if the difference between the estimate and the alphabet symbol is less than a threshold. If the difference is less than the threshold, control passes to step 460. However, if the difference is greater than or equal to the threshold, control passes to step 470.

In step 460, MIMO receiver 130 sets the value of the symbol equal to the value of the alphabet symbol. Control then passes to step 480.

In step 470, MIMO receiver 130 performs a search to select the value of the symbol based on a neighbourhood search. Thus, MIMO receiver 130 searches a neighbourhood of the alphabet symbol, with the neighbourhood containing one or more symbols that are neighbours of the alphabet symbol.

Step 470 may be performed to search for multiple symbols simultaneously also depending on the specific iteration of the flowchart of FIG. 4. Thus, for example, in a very first iteration of the flowchart of FIG. 4, MIMO receiver 130 may, in step 470, perform a search to select the value of only one symbol (first symbol). However, in an immediately next iteration, MIMO receiver 130 may, at step 470, perform a search to jointly detect (i.e., simultaneously or in parallel) the values of both the "first symbol" as well as a next symbol. In such an immediately next iteration, the value of the "first symbol" determined earlier may get 'refined', i.e., a more accurate estimate of the "first symbol" may be obtained, in addition to an estimate of the next symbol. In subsequent iterations as well, MIMO receiver 130 may perform searches for joint detection of multiple symbols, in a cumulative manner, as illustrated with an example below.

Control then passes to step 480.

In step 480, MIMO receiver 130 checks if all symbols of the transmitted vector have been estimated. If all the symbols have been estimated, control passes to step 499, in which the flowchart ends. If at least one symbol remains to be estimated, control passes to step 490.

In step 490, MIMO receiver 130 computes an estimate of a next symbol in the transmitted vector. Such computation is performed based on the equation Rx=y'. MIMO receiver 130 may use the value(s) of symbols estimated in earlier iteration(s) in the computation of step 490. Control then passes to step 440, and the corresponding steps of the flowchart of FIG. 4 are executed.

The operations of the flowchart of FIG. 4 are illustrated next with examples.

For simplicity of illustration in the example below, it is assumed that the H, Q and R matrices are each of size 3×3, corresponding to three transmit antennas in MIMO transmitter 110 and three receive antennas in MIMO receiver 130. Thus, the transmitted vector x contains three symbols, and the received vector y also contains three symbols. (Each of the three symbols of vector y represents a weighted combination of the symbols in the transmitted vector y added to a noise component, as specified by Equation 1).

Assume that the elements of upper triangular matrix R of the example are as given below:

$$R = \begin{bmatrix} 2 & 1 & 5 \\ 0 & -3 & 6 \\ 0 & 0 & 4 \end{bmatrix}$$

In the example, the equation (Rx+n=y') corresponds to the below:

$$\begin{bmatrix} 2 & 1 & 5 \\ 0 & -3 & 6 \\ 0 & 0 & 4 \end{bmatrix} \begin{bmatrix} x_1 \\ x_2 \\ x_3 \end{bmatrix} + \begin{bmatrix} n_1 \\ n_2 \\ n_3 \end{bmatrix} = \begin{bmatrix} y_1 \\ y_2 \\ y_3 \end{bmatrix} \qquad \text{Equation 8}$$

In Equation 8, elements y1, y2 and y3 constitute received vector y, and represent the three symbols received at (the respective three antennas of MIMO receiver 130. Elements x1, x2 and x3 constitute the transmitted vector x, and represent the corresponding three symbols transmitted by MIMO transmitter 110. Elements n1, n2 and n3 constitute the noise vector n, and represent the respective noise contributions by MIMO receiver 130.

Ignoring the effect of noise vector n, the equation (Rx+n=y') reduces to the equation (Rx=y), and Equation 8 reduces to Equation 9A specified below:

$$\begin{bmatrix} 2 & 1 & 5 \\ 0 & -3 & 6 \\ 0 & 0 & 4 \end{bmatrix} \begin{bmatrix} x_1 \\ x_2 \\ x_3 \end{bmatrix} = \begin{bmatrix} y_1 \\ y_2 \\ y_3 \end{bmatrix} \qquad \text{Equation 9A}$$

From Equation 9A, the following set of simultaneous equations (9B, 9C and 9D) is obtained:

$$y_1 = 2x_1 + x_2 + 5x_3 \qquad \text{Equation 9B}$$

$$y_2 = 0 - 3x_2 + 6x_3 \qquad \text{Equation 9C}$$

$$y_3 = 0 + 0 + 4x_3 \qquad \text{Equation 9D}$$

wherein, the terms $y_1$, $y_2$ and $y_3$ are known to MIMO receiver 130 (measured at the respective antennas of MIMO receiver 130).

From Equation 9D, $x_3$ may be directly estimated from $y_3$, $y_3$ being known in MIMO receiver 130. Thus, the process of QR decomposition of the channel matrix H, and use of the resulting upper triangular matrix R permits easy determination of an estimate of $x_3$. It may be observed from equation 9D that, as a result of the use of upper triangular matrix R in Equation 9A, there is no "interference" from the other two transmitted symbols $x_1$ and $x_2$. Hence, the value of $x_3$ as computed from Equation 9D may be better than that obtained (using joint detection) from the prior (RTS) approach described with reference to FIG. 3.

If the value of $x_3$, thus obtained, is within a threshold distance of a symbol in the alphabet used by MIMO transmitter 110, then $x_3$ is made equal to the value of such symbol. In an embodiment, the threshold is (dmin/4), wherein dmin is the minimum Euclidean distance (i.e., distance according to Euclidean geometry) between any two symbols in the alphabet. As an illustration, and referring to FIG. 2A, distance 210 represents the minimum Euclidean distance between any two symbols of the alphabet shown there. Assuming $x_3$ is represented by marker 220 in FIG. 2A, the nearest symbol (alphabet symbol) in the alphabet is symbol 230. If the Euclidean distance (240) between $x_3$ (220) and the nearest symbol (230) is less than dmin/4, then $x_3$ is set as symbol 230.

If however, distance (240) is greater than or equal to dmin/4, then MIMO receiver 130 performs a search to select the value of $x_3$ from a neighbourhood of symbol 230. In particular, MIMO receiver 130 performs an RTS search similar to that described above with respect to FIG. 3, but only to estimate one symbol, namely $x_3$. Thus, the initial solution vector of step 302 of FIG. 3 would have only one symbol, namely alphabet symbol 230. Corresponding to step 304, MIMO receiver 130 determines a neighbourhood of alphabet symbol 230. The neighbourhood may be determined similar to the manner described above with respect to FIG. 3.

A 'best' symbol ($x_{best}$) in the neighbourhood (for example, that symbol in the neighbourhood which minimizes $\|y_3 - 4x_{best}\|^2$) is then selected as the 'current' symbol. The corresponding operations of the flowchart of FIG. 3 are then performed to determine a final estimate of a symbol (symbol $x_3$) rather than of an entire transmitted vector as noted in the description above with respect to FIG. 3. When the stopping criterion is reached (step 399), MIMO receiver 130 obtains a final estimate for symbol $x_3$.

Thus, according to the approach of FIG. 4, MIMO receiver 130 initially determines a single symbol (first symbol) in a transmitted vector. The single symbol may be determined either directly in step 460 of the flowchart of FIG. 4, or be estimated using RTS as described above. The value of the "first symbol" is determined (i.e., the "first symbol" is detected) in the very first iteration of the flowchart of FIG. 4.

Since, two more symbols $x_1$ and $x_2$ remain to be estimated, MIMO receiver 130 operates to estimate a next symbol, corresponding to the operations of steps 480 and 490. As noted above, MIMO receiver 130 may use the value(s) of symbol(s) estimated in an earlier iteration to compute the estimate of the next symbol. In the example, the 'next' symbol is $x_2$. Accordingly, MIMO receiver 130 applies the value of $x_3$ (already obtained) in Equation 9C to obtain $x_2$. MIMO receiver 130 then obtains the alphabet symbol nearest to the obtained value of $x_2$ in a manner similar to that described above with respect to $x_3$.

If the value of $x_2$, thus obtained, is within a distance (dmin/4) of the nearest alphabet symbol, then $x_2$ is determined to be the nearest symbol. Otherwise, MIMO receiver 130 performs a search to select the value of $x_2$ based on a neighbourhood search according to the RTS technique described above, and similar to the manner in which MIMO receiver 130 estimates symbol $x_3$.

In an embodiment, instead of merely estimating just the one symbol $x_2$ in the second iteration, MIMO receiver 130 operates to estimate the vector $[x_2 \ x_3]^T$. Thus, the corresponding initial solution vector (of step 302 of FIG. 3) is the set of two symbols, namely $x_3$ (determined previously) and the alphabet symbol nearest to the value of $x_2$. The corresponding operations of the flowchart of FIG. 3 are performed to obtain an estimate of vector $[x_2 \ x_3]^T$. Thus, in addition to estimating $x_2$, MIMO receiver 130 refines the estimate of $x_3$ obtained in the previous iteration of flowchart of FIG. 4. The corresponding operations of flowchart of FIG. 3 are then performed till a stopping criterion is reached, and the values for $x_2$ and $x_3$ are obtained.

Estimation of symbol $x_1$ is performed in a similar manner. Thus, if in step 450, the Euclidean distance between the estimate of $x_1$ and the corresponding nearest alphabet symbol is not less than dmin/4, MIMO receiver 130 performs RTS to estimate the vector $[x_1 \ x_2 \ x_3]^T$. Thus, in addition to estimating $x_1$, MIMO receiver 130 refines the previously obtained estimates of $x_2$ and $x_3$.

It may thus be appreciated that, in contrast to the prior RTS approach, the LTS approach processes one 'layer' in each iteration (of FIG. 4). In the example given above, the 'first layer' corresponds to the determination of $x_3$, the second layer corresponds to the determination of $x_2$ and $x_3$ ($x_3$ being further refined in this iteration), and the third layer corresponds to the determination of $x_1$, $x_2$ and $x_3$ ($x_2$ and $x_3$ being further refined in this iteration). The RTS approach, on the other hand, employs only joint detection, i.e., estimates all symbols in the transmitted vector jointly.

The operations of the flowchart of FIG. 4 are expressed in mathematical terms next.

If 'nt' symbols are transmitted from 'nt' antennas in MIMO transmitter 110, then the upper triangular matrix R obtained by QR decomposition of channel matrix H contains 'nt' layers (i.e., rows). The LTS approach, described and illustrated above with respect to FIG. 4, processes one layer at a time, starting with the $nt^{th}$ layer first (corresponding to the bottom-most row of R, and containing only one non-zero entry). In the $k^{th}$ layer (k being in the range [nt, (nt−1), (nt−2), ..., 1]), the LTS approach, detects the (nt−k+1)-sized sub-vector [xk, xk+1, ..., xnt].

Since matrix R is upper triangular, and as illustrated in the example above with respect to symbol $x_3$, there will be no interference to the symbol xnt in the $nt^{th}$ layer from other symbols. In the $(nt-1)^{th}$ layer, there will be one interferer, namely symbol xnt. In the $(nt-2)^{th}$ layer there will be two interferers, namely x(nt−1) and x(nt), and so on in the subsequent layers. In the LTS technique, joint detection search (i.e., step 470 of the flowchart of FIG. 4) in a layer is skipped if a simple cancellation of interference due to the already detected symbols in the previous layer results in a good quality output (corresponding to operations of steps 450 followed by step 460).

The operations performed in the kth layer (for k=[nt, n(t−1), ..., 1]) are as follows:
1) Calculate rk as specified below:

$$rk = xbark - \sum_{l=k+1}^{nt} \frac{rkl}{rkk}(xl - xbarl) \qquad \text{Equation 10}$$

wherein, rk represents an estimate of a symbol in the kth layer,
xbar represents $(H^H H)^{-1} H^H y$,
xbark represents $k^{th}$ element of xbar,
rkl represents $(k,l)^{th}$ element of the matrix R,
rkk represents $(k,k)^{th}$ element of the matrix R,
xl represents $l^{th}$ estimated symbol, and
xbarl represents $l^{th}$ element of xbar.

The operation of Equation 10 represents a cancellation operation that removes the interference due to the symbols detected in the previous layer.

2) Determine the symbol (aq) in the alphabet which is closest to rk in Euclidean distance.
  i) If |rk−aq|<dmin/4, then xcapk=aq. Make k=k−1 and return to Step (1).

ii) If |rk−aq|≥dmin/4, then set xcapk=xbark, and execute RTS. Inputs to RTS for the kth layer are Htilde, ytilde and xtilde(0) as specified below.

$$xtilde(0) = [xcap(k), xcap(k+1), \ldots Xcap(nt)] \quad \text{Equation 11A}$$

$$Htilde = \begin{bmatrix} Rkk & Rk(k+1) & \ldots & Rkn_1 \\ 0 & R(k-1)(k-1) & \ldots & R(k-1)n_t \\ \vdots & \vdots & \vdots & \vdots \\ 0 & 0 & \ldots & Rn_t n_t \end{bmatrix} \quad \text{Equation 11B}$$

$$ytilde = Htilde[xbar(K), xbar(k+1), \ldots Xbar(nt)]^T \quad \text{Equation 11C}$$

Htilde represents a sub-matrix within matrix R. The size of Htilde increases with each layer.

Set the output of the current iteration of RTS as the updated [xcap(k), xcap(K+1), . . . xcap(nt)] sub-vector. Set k to k−1, and return to step (1).

In another embodiment, the LTS approach described above is improved by selecting an order in which to detect symbols in a transmitted vector, as described next.

4. LTS with Ordering

In an embodiment, prior to commencement of the LTS detection technique described in detail above, the elements of channel matrix H are ordered to enable detection of symbols in an optimal manner. In particular, the ordering is performed such that the last row of H corresponds to the received signal that has the best signal to noise ratio (SNR) among the SNRs of all the received signals (at the corresponding antennas of MIMO receiver 130). As a result, the symbol estimated first (for example, $x_3$ in the example provided above) may have a greater accuracy than otherwise. As a result, symbols estimated subsequently may also be more accurate, and the 'performance' of such an improved (or modified) LTS detection technique (termed herein as LTS with ordering) may be improved, i.e., LTS with ordering may more accurately estimate the symbols of a transmitted vector. In the embodiment, the optimum ordering based on the post-detection SNR of the symbols is performed in the manner described next.

For each row 'i' of a transmitted vector x, the rows being numbered from 1 through nt (i.e., index i ranging from nt to 1), wherein nt is the total number of transmit antennas (also noted above as N) in MIMO receiver 130, and with the initial (non-ordered) channel matrix H being Hnt, the following steps are performed:

(a) Determine the Moore-Penrose pseudo-inverse (Hm-p (i)) of H(i), where H(i) is obtained by zeroing columns p(i+1) through p(nt) of H.

(b) Determine p(i), the row index of Hm-p(i) that results in the minimum norm among all rows of Hm-p(i).

Once steps (a) and (b) above are completed for all values of index 'i', detection of transmitted symbols is performed in the following order using LTS: pnt, followed by pn(t−1), followed by pn(t−2), and so on. The ordering operation noted above is illustrated with an example next.

The example below assumes that MIMO transmitter 110 transmits from only three antennas, i.e., three transmitted symbols are to be detected at MIMO receiver 130. Assume that the initial unordered channel matrix H is as specified below:

$$H = \begin{bmatrix} 8 & 9 & 3 \\ 9 & 6 & 5 \\ 2 & 1 & 9 \end{bmatrix}$$

The Moore-Penrose pseudo-inverse of H above is as specified below:

$$Hm\text{-}p = \begin{bmatrix} -0.1914 & 0.3047 & -0.1055 \\ 0.2773 & -0.2578 & 0.0508 \\ 0.0117 & -0.0391 & 0.1289 \end{bmatrix}$$

The squared-norms of the 3 rows are respectively, 0.1406, 0.1460, 0.0183. The third row has the least squared-norm. Therefore, the symbol transmitted from the third antenna is detected first.

Next, the third column of H is set to all zeros to obtain the following matrix H3:

$$H3 = \begin{bmatrix} 8 & 9 & 0 \\ 9 & 6 & 0 \\ 2 & 1 & 0 \end{bmatrix}$$

The Moore-Penrose pseudo-inverse of H3 above is as specified below:

$$Hm\text{-}p(3) = \begin{bmatrix} -0.1736 & 2.2454 & 0.0902 \\ 0.2646 & -0.2154 & -0.0893 \\ 0 & 0 & 0 \end{bmatrix}$$

The squared-norm of the non-zero rows (rows 1 and 2) are 0.0985 and 0.1244 respectively. The first row has the least squared-norm. Therefore, the symbol transmitted from the first antenna is detected next.

Next, the entries of the third as well as the first column of H are set to zero to obtain the following matrix H1:

$$H1 = \begin{bmatrix} 0 & 9 & 0 \\ 0 & 6 & 0 \\ 0 & 1 & 0 \end{bmatrix}$$

The Moore-Penrose pseudo-inverse of H1 above is as specified below:

$$Hm\text{-}p(1) = \begin{bmatrix} 0 & 0 & 0 \\ 0.0763 & 0.0508 & 0.0085 \\ 0 & 0 & 0 \end{bmatrix}$$

The squared-norm of the non-zero row is 0.0085. Thus, the symbol corresponding to the second antenna is detected last.

The ordered H matrix is thus as specified below:

$$H\text{-ordered} = \begin{bmatrix} 9 & 8 & 3 \\ 6 & 9 & 5 \\ 1 & 2 & 9 \end{bmatrix}$$

Matrix H-ordered is then QR-decomposed to generate an upper triangular matrix R (step 420 of the flowchart of FIG. 4), and the LTS detection technique as described above is performed to detect the three transmitted symbols.

4. Random-Restart Reactive Tabu Search (R3TS)

Figure 5:
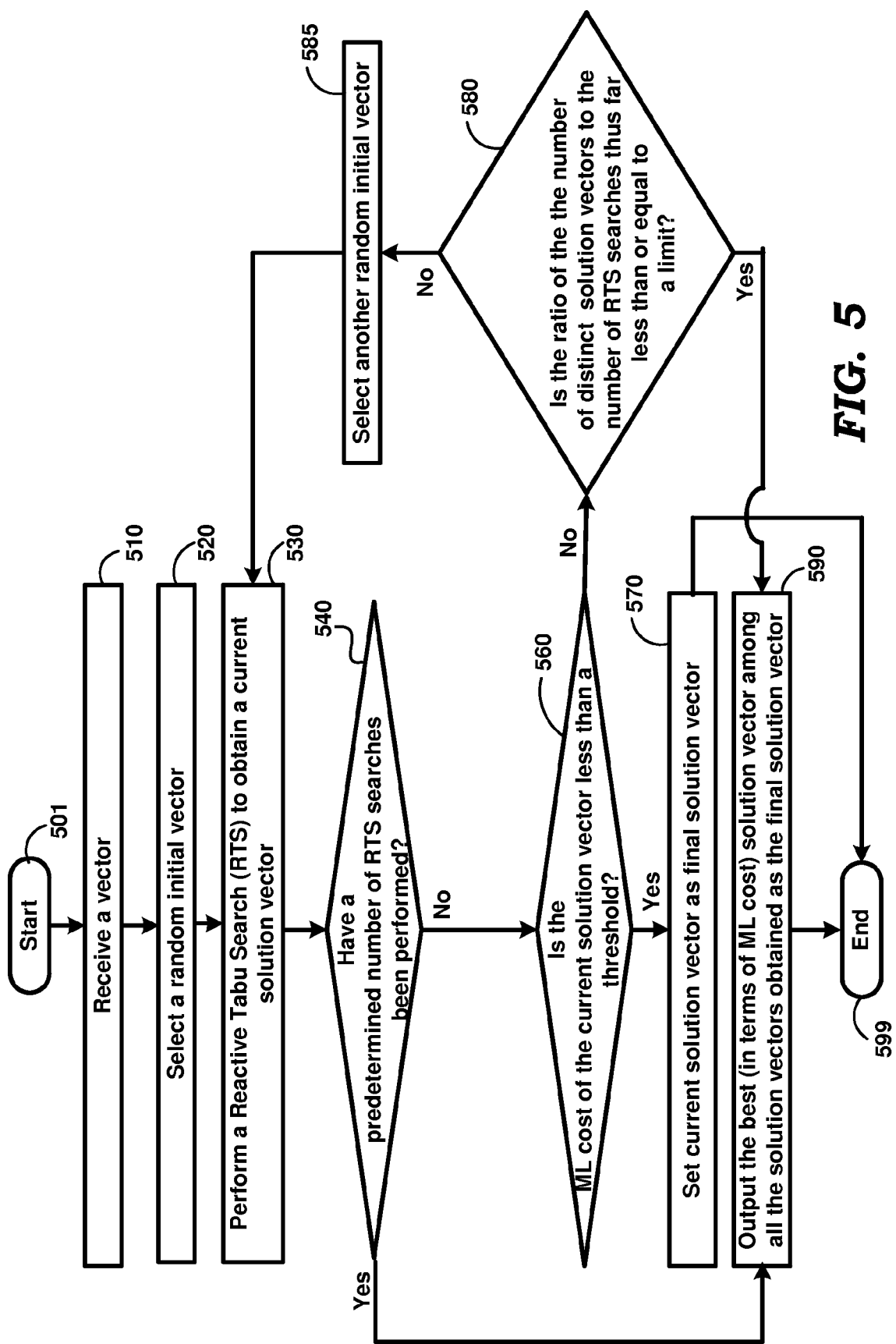
FIG. 5 is a flowchart illustrating the manner in which a transmitted signal vector is estimated in another embodiment.

FIG. 5 is a flowchart illustrating the manner in which a transmitted signal vector is estimated in an alternative embodiment. The approach of FIG. 5 is referred to herein as a random-restart reactive tabu search (R3TS) approach. Again, the steps in the flowchart of FIG. 5 may be performed by MIMO receiver 130, or by a component or device external to MIMO receiver 130, but which has access to vector y, matrix H and other relevant information such as for example the configuration (number of transmit antennas, number of receive antennas, etc) of MIMO system 100. The steps of the flowchart of FIG. 5 are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein. The flowchart starts at step 501, in which control passes immediately to step 510.

510, MIMO receiver 130 receives a "received vector" (y). The received vector y represents a corresponding transmitted vector (x) according to Equation 1 (i.e., y=Hx+n) noted above. Control then passes to step 520.

In step 520, MIMO receiver 130 selects a random initial vector. The elements of the random initial vector are chosen (at random) from the transmission alphabet. The size (i.e., number of elements) of the random initial vector is equal to the size of transmitted vector x. The 'random selection' may be done based on known random number generation methods. Control then passes to step 530.

In step 530, MIMO receiver 130 performs an RTS search using the random initial vector. Thus, the random initial vector selected in step 520 corresponds to the 'initial solution vector' of step 302 of the flowchart of FIG. 3. The RTS search of step 530 involves the operations of the corresponding steps of the flowchart of FIG. 3 (except steps 301 and 302). At the end (399) of the RTS search, MIMO receiver 130 obtains a 'current' solution vector, and control passes to step 540 of FIG. 5.

In step 540, MIMO receiver 130 checks if a predetermined number (MAX) of RTS searches (step 530) have been performed. The predetermined number (MAX) may be selected empirically, and equals hundred in an embodiment. If the predetermined number of RTS searches have been performed, control passes to step 590, otherwise control passes to step 560.

In step 560, MIMO receiver 130 determines if the maximum likelihood (ML) cost of the current solution vector is less than a constant threshold ($\Theta$). As noted above with respect to FIG. 3, the ML cost is specified by the ML cost function ($\|Hx-y\|^2$), i.e., the ML cost of step 560 equals the value of ML cost function ($\|Hx-y\|^2$) obtained with the current solution vector (in place of 'x' in the ML cost function. If the ML cost is less than the constant value, control passes to step 570, otherwise control passes to step 580.

In step 570, MIMO receiver 130 sets the current solution vector as the final solution vector. The entries of the final solution vector represent the detected values of the transmitted vector. Control then passes to step 599, in which the flowchart ends.

In step 580, MIMO receiver 130 checks if the ratio (L/K) of the number (L) of distinct solution vectors to the number (K) of RTS searches performed thus far (i.e., the number of times step 530 has been performed) is less than or equal to a limit ($P_L$). If L/K is less than or equal to the limit ($P_L$), control passes to step 590, otherwise control passes to step 585.

In step 585, MIMO receiver 130 selects another random initial vector. Control then passes to step 530, and the corresponding operations of the flowchart of FIG. 5 are performed.

In step 590, MIMO receiver 130 provides the solution vector with the best (i.e., lowest) ML cost among the solution vectors obtained thus far as the final solution vector. Control then passes to step 599, in which the flowchart ends.

Thus, according to the R3TS approach, multiple RTS searches are performed, with each search starting with a random initial vector. A final solution vector is then provided based on the results of the multiple RTS searches, as described above with respect to the flowchart of FIG. 5.

In an embodiment, the constant value $\Theta$ is determined as follows. Assuming that an obtained solution vector is identical to the transmitted vector, the ML cost is $\|n\|^2$, n being the noise vector. $\|n\|^2$ has a non-central chi-square distribution with a mean value of ($n_r\sigma^2$) and a variance of ($n_r\sigma^4$), wherein $n_r$ is the number of antennas used in MIMO receiver 130 to receive the transmitted vector. The value of $\sigma^2$ can be measured using known noise statistics measurement techniques. The value of $\Theta$ is taken empirically to be $n_r\sigma^2+[2*\text{sqrt}(n_r\sigma^4)]$, wherein 'sqrt' represents a 'square root of' operation. Thus, $\Theta$ is taken to be the mean plus twice the standard deviation of the ML cost variable corresponding to error-free detection. The threshold comparison of step 560 may reduce the number of searches and thus the complexity of the search. In an embodiment, the limit ($P_L$) used in step 580 is set to 0.2.

It is noted here that while the RTS searches (step 530) are described above as being performed sequentially, MIMO receiver 130 may, in the alternative, perform multiple RTS searches in parallel (assuming sufficient computing resources are available), with each of the multiple RTS searches starting with a corresponding random initial vector and generating a corresponding solution vector. MIMO receiver 130 may then select the least-ML-cost solution vector (from among the multiple solution vectors obtained) as the final solution vector. The total number of parallel RTS searches to be performed may equal the predetermined number (MAX). Such a parallel approach may, however, be less computationally efficient (i.e., be more complex) than the sequential approach described above with respect to the flowchart of FIG. 5.

The LTS and R3TS detection techniques described above may not yield a good performance for under-determined MIMO systems, i.e., when the number of transmit antennas (N of FIG. 1) is greater than the number of receive antennas (M of FIG. 1), since in such a scenario there are fewer numbers of equations than the number of unknowns (transmitted symbols to be detected). An example scenario of an under-determined MIMO system is when MIMO receiver 130 is a mobile terminal with space constraints, and therefore having fewer receive antennas than the number of transmit antennas of a corresponding MIMO transmitter (e.g., a base station).

In particular, the use of a fixed threshold $\Theta$ in the stopping criterion may be a good approach only when MIMO system 100 is a fully determined or over-determined system, since the probability of the ML cost of an incorrect RTS solution being lower than Θ is very small.

However, in general, incorrect RTS solutions have lower ML costs than Θ (equaling $n_t\sigma^2+[2*\text{sqrt}(n_t\sigma^4)]$) with high probability when MIMO system 100 is under-determined (UD-MIMO). As a result, the use of a fixed threshold (as described above) when MIMO system 100 is under-determined may result in an unacceptably poor performance (BER being unacceptably high).

A possible solution to the problem noted above is to set threshold Θ at a much lower value when MIMO system 100 is an under-determined system. However, such an approach may result in a large number of restarts, i.e., the flowchart of FIG. 5 may iterate a large number of times through step 530 since the probability of step 560 being evaluated true may be very low. The complexity involved in detecting the transmitted symbols may, therefore, be correspondingly higher.

An alternative embodiment addresses MIMO-receiver operation in such an under-determined scenario. In such an alternative embodiment, R3TS detection technique described above is operated with a variable-threshold-based stopping criterion, in contrast to the fixed threshold Θ noted above with respect to FIG. 5. The use of a variable threshold for comparison with ML cost may enable near-ML bit error rate (BER) performance when MIMO system 100 is an under-determined system (UD-MIMO) without undue increase in computational complexity. The corresponding detection techniques are described next.

5. Random-Restart Reactive Tabu Search with Variable Threshold (R3TS-VT)

Figure 6:
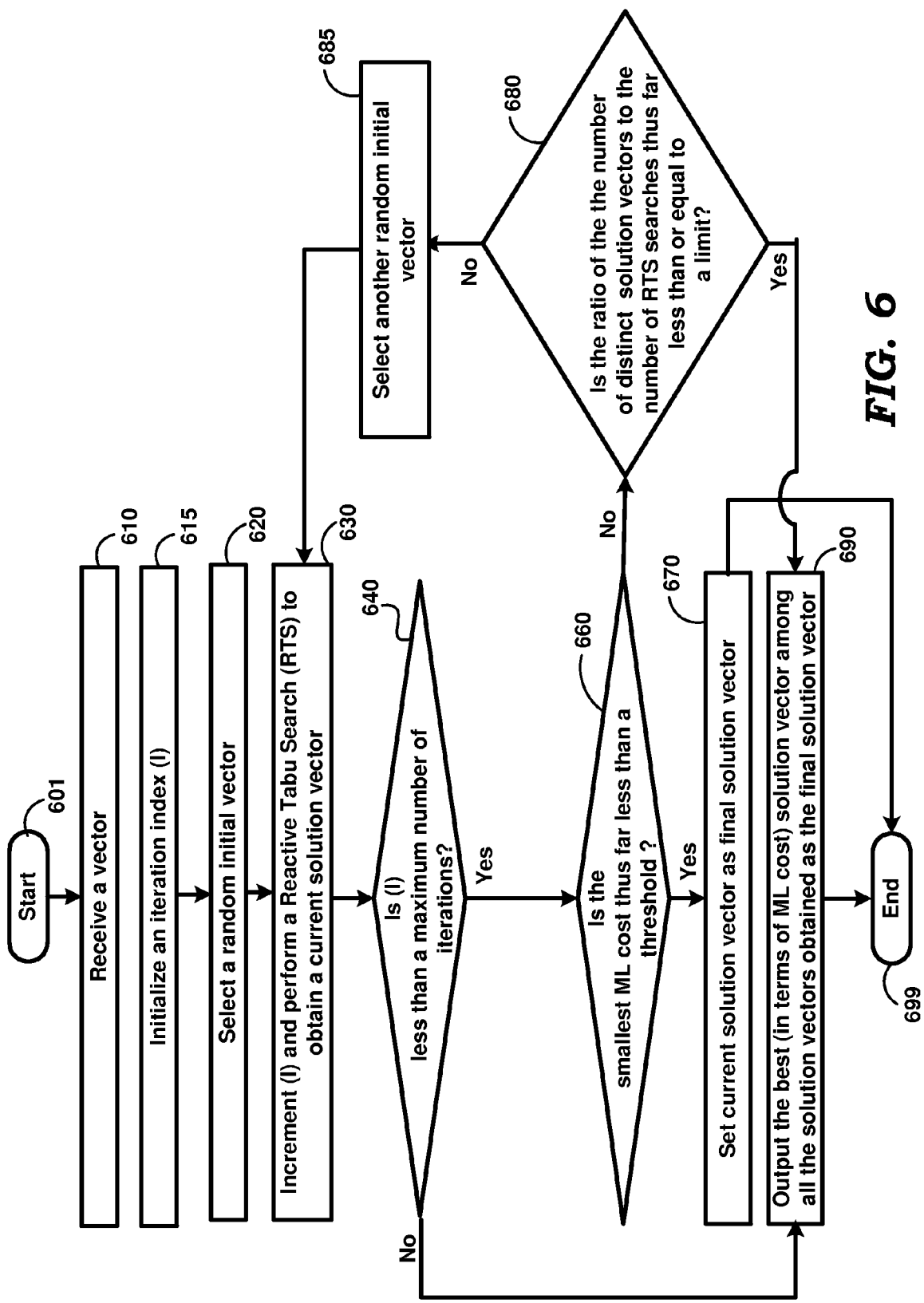
FIG. 6 is a flowchart illustrating the manner in which a transmitted signal vector is estimated in an alternative embodiment.

FIG. 6 is a flowchart illustrating the manner in which a transmitted signal vector is estimated in an alternative embodiment. The approach of FIG. 6 is referred to herein as a random-restart reactive tabu search with variable threshold (R3TS-VT). The flowchart starts at step 601, in which control passes immediately to step 610.

In step 610, MIMO receiver 130 receives a "received vector" (y). Control then passes to step 615, in which MIMO receiver 130 initializes an iteration index (I) to the value zero. Control then passes to 620, in which MIMO receiver 130 selects a random initial vector. The elements of the random initial vector are chosen (at random) from the transmission alphabet. The size of the random initial vector is equal to the size of transmitted vector x. The 'random selection' may be done based on one of several well-known techniques. Control then passes to step 630.

In step 630, MIMO receiver 130 increments index (I) by a value of one, and performs an RTS search using the random initial vector selected in step 620 to obtain a 'current' solution vector. The RTS search may be performed in a manner similar to that described with respect to step 530 of FIG. 5. Control then passes to step 640.

In step 640, MIMO receiver 130, checks if the value of iteration index (I) is less than a predetermined number (MAX−VT). If (I) is less than MAX−VT, control passes to step 660, otherwise control passes to step 690.

In step 660, MIMO receiver 130 determines if the smallest ML cost obtained thus far (i.e., for the corresponding solution vectors generated by the RTS of step 630) is less than a variable threshold (Θ(I)). Index (I) equals the number of times step 530 has been performed thus far in the operations of the flowchart of FIG. 6, with (Θ(I)) representing the current value of the variable threshold. The value of variable threshold (Θ(I)) is changed each time step 630 is performed, although not noted in the description of step 630. The manner in which the variable threshold is varied in an embodiment is described below. If the smallest ML cost is less than the current value of the variable threshold, control passes to step 670, otherwise control passes to step 680.

In step 670, MIMO receiver 130 sets the current solution vector as the final solution vector. The entries of the final solution vector represent the detected values of the transmitted vector. Control then passes to step 699, in which the flowchart ends.

In step 680, MIMO receiver 130 checks if the ratio (L/I) of the number (L) of distinct solution vectors (obtained thus far) to the index (I) is less than or equal to a limit (PL−VT)? If L/I is than or equal to the limit, control passes to step 690, otherwise control passes to step 685.

In step 685, MIMO receiver 130 selects another random initial vector. Control then passes to step 630, and the corresponding operations of the flowchart of FIG. 6 are performed.

In step 690, MIMO receiver 130 provides the solution vector with the best (i.e., lowest) ML cost among the solution vectors obtained thus far as the final solution vector. Control then passes to step 699, in which the flowchart ends.

Thus, the R3TS-VT detection technique employs a variable threshold for the ML cost. In an embodiment, variable threshold (Θ(I)) is different for each iteration (I), and is determined as specified below:

$$\Theta(I)=n_t\sigma^2+K(I)[2*\text{sqrt}(n_t\sigma^4)] \quad \text{Equation 12}$$

wherein,
K(I)=0 for (I<=T),
K(I)=0.5 for (T<I<=2T),
K(I)=1 for (2T<I<=3T),
K(I)=1.5 for (3T<I<=4T),
K(I)=2 for (I>4T),
wherein, $$T=[(5q(\alpha-1))],$$

q=$\log_2 X$ for X-QAM alphabet, X corresponding to the specific type of QAM such as, for example, 4-QAM, 8-QAM, 16-QAM, 32-QAM, etc, and
α=N/M, N being the number of transmit antennas, and M being the number of receive antennas.

In an embodiment, MAX−VT equals 500, and PL−VT equals 0.05.

LTS, LTS with ordering, R3TS and R3TS-VT, as described in detail above, may achieve very reliable detection in MIMO systems with large numbers of antennas (for example 8×8, 16×16, 32×32, 64×64 MIMO) with higher-order QAM modulation (4-QAM, 16-QAM, 64-QAM). In general, however, LTS, LTS with ordering, R3TS and R3TS-VT can be used for any MIMO system and modulation type.

MIMO receiver 130 may be implemented using software, hardware, or a combination of hardware and software. In general, when throughput performance is of primary consideration, the implementation is done more in hardware (e.g., in the form of an application specific integrated circuit). When cost is of primary consideration, the implementation is performed more in software (e.g., using a processor executing instructions provided in software/firmware). Cost and performance can be balanced by employing a mix of hardware, software and/or firmware. Some of the implementation approaches noted above may be designed to incorporate at least some degree of parallelism or pipelining. For example, when the implementation is substantially in software, some of the time-critical and/or compute-intensive operations may be executed by dedicated hardware units, with the less time-critical and/or less compute-intensive operations being executed by software instructions. An example embodiment implemented substantially in software is described next

6. Digital Processing System

Figure 7:
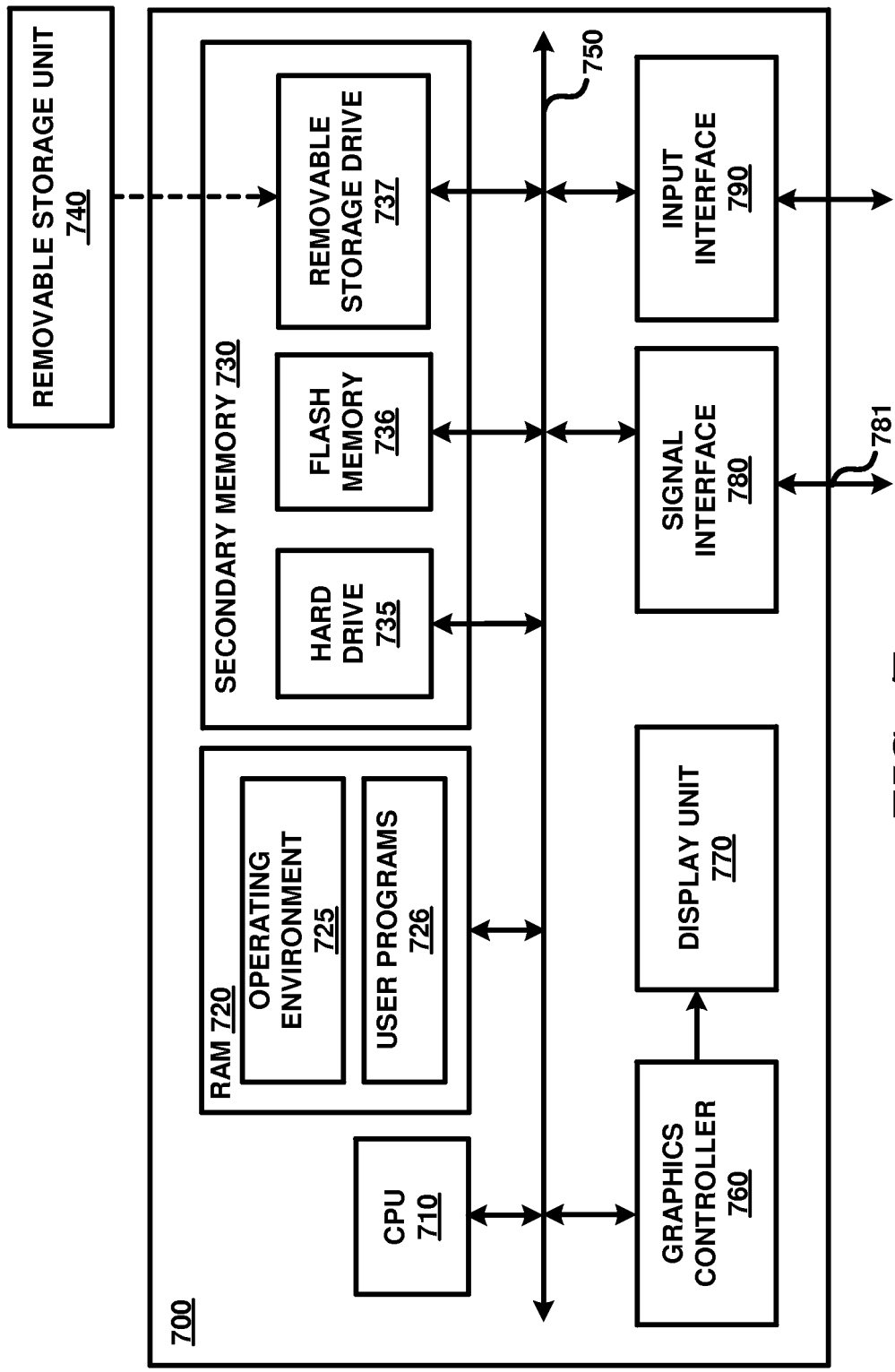
FIG. 7 is a block diagram illustrating the details of a baseband processor, in which detection of a transmitted vector is performed by execution of appropriate execution modules.

FIG. 7 is a block diagram illustrating the details of a baseband processor, in which detection of a transmitted vector is performed by execution of appropriate execution modules. Digital processing system (700) may be implemented as part of MIMO receiver 130 or as a system external to MIMO receiver 130, but designed to receive signal inputs enabling it to detect symbols of a transmitted vector. For simplicity, signal processing chains for implementing corresponding operations (such as filtering down-conversion, etc) on signals received from antennas 140-1 through 140-M of MIMO receiver 130 are not shown in FIG. 7. It is assumed that such components are present, and provide a baseband signal(s) to system 700 via path 781 and signal interface 781.

Digital processing system 700 may contain one or more processors such as a central processing unit (CPU) 710, random access memory (RAM) 720, secondary memory 730, graphics controller 760, display unit 770, signal interface 780, and input interface 790. All the components except display unit 770 may communicate with each other over communication path 750, which may contain several buses as is well known in the relevant arts.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 via communication path 750. RAM 720 is shown currently containing software instructions constituting operating environment 725 and/or user programs 726 (such as are executed by the blocks of FIG. 1). The operating environment contains utilities shared by user programs, and such shared utilities include operating system, device drivers, virtual machines, etc., which provide a (common) run time environment for execution of user programs/applications.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse), and may be used to provide inputs.

Signal interface 780, as noted above, provides appropriate electrical and protocol interfaces to the various signal processing chains (not shown) of MIMO receiver 130.

Secondary memory 730 may contain hard drive 735, flash memory 736, and removable storage drive 737. Secondary memory 730 may store data and software instructions, which enable digital processing system 700 to provide several features in accordance with the description provided above. The blocks/components of secondary memory 730 constitute computer (or machine) readable media, and are means for providing software to digital processing system 700. CPU 710 may retrieve the software instructions, and execute the instructions to provide various features of the embodiments described above Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer-executable instructions and data. However, the computer (or machine, in general) readable medium can be in other forms (e.g., non-removable, random access, etc.).

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

We claim:

1. A method of determining a transmitted vector (x) representing a plurality of symbols transmitted on a wireless medium by a wireless transmitter, said plurality of symbols belonging to an alphabet according to a modulation technique employed by said wireless transmitter, said method being performed in a wireless receiver, wherein said wireless receiver and said wireless transmitter form a multiple-input multiple-output (MIMO) system, said method comprising:

receiving a received vector (y) representative of said transmitted vector (x);

performing a plurality of searches to generate a corresponding plurality of estimates of said transmitted vector (x);

providing, as a final estimate of said transmitted vector (x), a first estimate in said corresponding plurality of estimates that has the least cost, wherein each of said plurality of searches comprises:

generating a random initial vector having a same size as said transmitted vector (x);

creating a vector-neighborhood of said random initial vector;

choosing, as a solution vector, a vector in said vector-neighborhood that has a least cost function as compared to other vectors in said vector-neighborhood; and repeating said creating and said choosing to respectively create corresponding vector-neighborhoods and to choose corresponding vectors as corresponding solution vectors till a stop criterion is reached, wherein the solution vector obtained by said repeating when said stop criterion is reached is set as a corresponding estimate of said corresponding plurality of estimates of said transmitted vector (x), wherein said performing performs only a subset of searches if a second estimate obtained at the end of said subset of searches has a cost less than a threshold cost, said subset of searches being contained in said plurality of searches, wherein said providing provides said second estimate obtained at the end of said subset of searches as said final estimate instead of said first estimate, wherein said threshold cost is different for each search in said subset of searches, said MIMO system being an under-determined system.

2. The method of claim 1, wherein searches in said plurality of searches are performed sequentially in time.

3. The method of claim 1, wherein said modulation technique is quadrature amplitude modulation (QAM).

4. The method of claim 1, wherein said creating excludes a tabu symbol from said vector-neighbourhood in a second iteration of said repeating if said tabu symbol was selected as a solution vector in a first iteration of said repeating, and a tabu period has not elapsed between said first iteration and said second iteration, wherein said second iteration occurs at a point in time later than said first iteration.

5. The method of claim 4, wherein said alphabet is X-QAM alphabet, wherein said threshold cost is specified by the following equation in each of said plurality of searches:

$$\Theta(I) = nr\sigma^2 + K(I)[2*\text{sqrt}(nr\sigma^4)],$$

wherein,
$K(I) = 0$ for $(I \leq T)$,
$K(I) = 0.5$ for $(T < I \leq 2T)$,
$K(I) = 1$ for $(2T < I \leq 3T)$,
$K(I) = 1.5$ for $(3T < I \leq 4T)$,
$K(I) = 2$ for $(I > 4T)$,
wherein, $$T = [(5q(\alpha-1))],$$

$q = \log_2 X$ for said X-QAM alphabet, X representing the number of symbols in the corresponding type of QAM alphabet, and $\alpha = N/M$, N being the number of transmit antennas in said wireless transmitter, and M being the number of receive antennas in said wireless receiver, $nr\sigma^2$ is the mean value of the noise vector in said wireless receiver, and $nr\sigma^4$ is the variance of said noise vector, and I is an index representing a current search in said plurality of searches.

6. The method of claim 5, wherein if said second estimate is greater than or equal to said threshold cost, and if a ratio of a current number of distinct solution vectors in said corresponding solution vectors to a current value of index I is less than or equal to a limit, then also said providing provides said first estimate as said final estimate.

7. A non-transitory machine readable medium carrying one or more sequences of instructions for execution by one or more processors in a wireless receiver of a multiple-input multiple-output (MIMO) system, wherein a wireless transmitter of said MIMO system transmits a transmitted vector (x), representing a plurality of symbols, on a wireless medium, wherein said plurality of symbols belong to an alphabet according to a modulation technique employed by said wireless transmitter, wherein execution of said one or more sequences of instructions by said one or more processors causes said wireless receiver to perform the actions of:

receiving a received vector (y) representative of said transmitted vector (x);

performing a plurality of searches to generate a corresponding plurality of estimates of said transmitted vector (x);

providing, as a final estimate of said transmitted vector (x), a first estimate in said corresponding plurality of estimates that has the least cost, wherein each of said plurality of searches comprises:
generating a random initial vector having a same size as said transmitted vector (x);
creating a vector-neighborhood of said random initial vector;
choosing, as a solution vector, a vector in said vector-neighborhood that has a least cost function as compared to other vectors in said vector-neighborhood; and
repeating said creating and said choosing to respectively create corresponding vector-neighborhoods and to choose corresponding vectors as corresponding solution vectors till a stop criterion is reached,
wherein the solution vector obtained by said repeating when said stop criterion is reached is set as a corresponding estimate of said corresponding plurality of estimates of said transmitted vector (x), wherein said performing performs only a subset of said plurality of searches if the a second estimate obtained at the end of said subset of searches has a cost less than a threshold cost, said subset of searches being contained in said plurality of searches, wherein said providing provides said second estimate obtained at the end of said subset of searches as said final estimate instead of said first estimate, wherein said threshold cost is different for each search in said subset, said MIMO system being an under-determined system.

8. The non-transitory machine readable medium of claim 7, wherein searches in said plurality of searches are performed sequentially in time.

9. The non-transitory machine readable medium of claim 7, wherein said modulation technique is quadrature amplitude modulation (QAM).

10. The non-transitory machine readable medium of claim 7, wherein said creating excludes a tabu symbol from said vector-neighbourhood in a second iteration of said repeating if said tabu symbol was selected as a solution vector in a first iteration of said repeating, and a tabu period has not elapsed between said first iteration and said second iteration, wherein said second iteration occurs at a point in time later than said first iteration.

11. The non-transitory machine readable medium of claim 10, wherein said alphabet is X-QAM alphabet, wherein said threshold cost is specified by the following equation in each of said plurality of searches:

$$\Theta(I) = nr\sigma^2 + K(I)[2*\text{sqrt}(nr\sigma^4)],$$

wherein,
$K(I) = 0$ for $(I \leq T)$,
$K(I) = 0.5$ for $(T < I \leq 2T)$,
$K(I) = 1$ for $(2T < I \leq 3T)$,
$K(I) = 1.5$ for $(3T < I \leq 4T)$,
$K(I) = 2$ for $(I > 4T)$,
wherein,
$T = [(5q(\alpha-1))],$ $q = \log_2 X$ for said X-QAM alphabet, X representing the number of symbols in the corresponding type of QAM alphabet, and $\alpha = N/M$, N being the number of transmit antennas in said wireless transmitter, and M being the number of receive antennas in said wireless receiver, $nr\sigma^2$ is the mean value of the noise vector in said wireless receiver, and $nr\sigma^4$ is the variance of said noise vector, and I is an index representing the current search of said plurality of searches.

12. A multiple-input multiple-output (MIMO) receiver for determining a transmitted vector (x) representing a plurality of symbols transmitted on a wireless medium by a wireless transmitter, said plurality of symbols belonging to an alphabet according to a modulation technique employed by said wireless transmitter, wherein said wireless receiver and said wireless transmitter form a MIMO system, said MIMO receiver comprising:

a processor and a memory, said processor to retrieve instructions stored in said memory and execute the retrieved instructions, wherein upon execution of said retrieved instructions, said MIMO receiver:
receives a received vector (y) representative of said transmitted vector (x);

performs a plurality of searches to generate a corresponding plurality of estimates of said transmitted vector (x);
provides, as a final estimate of said transmitted vector (x), a first estimate in said corresponding plurality of estimates that has the least cost,
wherein to perform each of said plurality of searches said MIMO receiver:
generates a random initial vector having a same size as said transmitted vector (x);
creates a vector-neighborhood of said random initial vector;
chooses, as a solution vector, a vector in said vector-neighborhood that has a least cost function as compared to other vectors in said vector-neighborhood; and
repeats said creating and said choosing to respectively create corresponding vector-neighborhoods and to choose corresponding vectors as corresponding solution vectors till a stop criterion is reached,
wherein the solution vector obtained by said MIMO receiver when said stop criterion is reached is set as a corresponding estimate of said corresponding plurality of estimates of said transmitted vector (x),
wherein said MIMO receiver performs only a subset of searches if a second estimate obtained at the end of said subset of searches has a cost less than a threshold cost, said subset of searches being contained in said plurality of searches,
wherein said MIMO receiver provides said second estimate obtained at the end of said subset of searches as said final estimate instead of said first estimate,
wherein said threshold cost is different for each search in said subset, said MIMO system being an under-determined system.

13. The MIMO receiver of claim 12, wherein searches in said plurality of searches are performed sequentially in time.

14. The MIMO receiver of claim 12, wherein said modulation technique is quadrature amplitude modulation (QAM).

15. The MIMO receiver of claim 12, wherein said MIMO receiver excludes a tabu symbol from said vector-neighborhood in a second iteration of said repeats operation if said tabu symbol was selected as a solution vector in a first iteration of said repeats operation, and a tabu period has not elapsed between said first iteration and said second iteration, wherein said second iteration occurs at a point in time later than said first iteration.

16. The MIMO receiver of claim 15, wherein said alphabet is X-QAM alphabet, wherein said threshold cost is specified by the following equation in each of said plurality of searches:

$$\Theta(I) = nr\sigma2 + K(I)[2*\text{sqrt}(nr\sigma4)],$$

wherein,
$K(I)=0$ for $(I<=T)$,
$K(I)=0.5$ for $(T<I<=2T)$,
$K(I)=1$ for $(2T<I<=3T)$,
$K(I)=1.5$ for $(3T<I<=4T)$,
$K(I)=2$ for $(I>4T)$,
wherein, $$T=[(5q(\alpha-1))],$$

$q=\log_2 X$ for said X-QAM alphabet, X representing the number of symbols in the corresponding type of QAM alphabet, and
$\alpha=N/M$, N being the number of transmit antennas in said wireless transmitter, and M being the number of receive antennas in said wireless receiver,
$nr\sigma2$ is the mean value of the noise vector in said wireless receiver, and
$nr\sigma4$ is the variance of said noise vector, and
I is an index representing a current search in said plurality of searches.

* * * * *